(12) United States Patent
Aoki

(10) Patent No.: US 6,719,534 B2
(45) Date of Patent: Apr. 13, 2004

(54) VEHICLE SEAT BLOWER UNIT WITH A MOTOR MOUNTED WITHIN A SCROLL HOUSING AND A COOLING MOTOR ATTACHMENT BRACKET

(75) Inventor: Shinji Aoki, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/119,104

(22) Filed: Apr. 9, 2002

(65) Prior Publication Data

US 2002/0150478 A1 Oct. 17, 2002

(30) Foreign Application Priority Data

| Apr. 11, 2001 | (JP) | 2001-112252 |
| Jun. 13, 2001 | (JP) | 2001-178969 |
| Feb. 5, 2002 | (JP) | 2002-028455 |

(51) Int. Cl.[7] .............................................. F04B 49/06
(52) U.S. Cl. .................. 417/44.1; 417/231; 417/423.7; 417/423.14; 417/423.8; 417/352
(58) Field of Search ................ 417/44.1, 230, 417/231, 423.7, 423.14, 424.2, 423.8, 425.15, 424.1, 352

(56) References Cited

U.S. PATENT DOCUMENTS

| 5,119,466 A | * | 6/1992 | Suzuki | 388/831 |
| 5,176,509 A | * | 1/1993 | Schmider et al. | 417/423.7 |
| 5,313,150 A | * | 5/1994 | Arakawa et al. | 318/768 |
| 5,694,010 A | * | 12/1997 | Oomura et al. | 318/254 |
| 6,048,024 A | * | 4/2000 | Wallman | 297/180.14 |
| 6,294,852 B1 | * | 9/2001 | Lee | 310/52 |
| 6,418,927 B1 | * | 7/2002 | Kullik | 128/204.18 |
| 6,468,041 B2 | * | 10/2002 | Ozaki | |
| 6,488,475 B2 | * | 12/2002 | Murata et al. | 417/32 |
| 2001/0004008 A1 | * | 6/2001 | Aoki et al. | 165/43 |

FOREIGN PATENT DOCUMENTS

| JP | A-58-19634 | 2/1983 |
| JP | A-7-284260 | 10/1995 |
| JP | A-10-196596 | 7/1998 |
| JP | A-11-34634 | 2/1999 |

* cited by examiner

Primary Examiner—Justine R. Yu
Assistant Examiner—Emmanuel Sayoc
(74) Attorney, Agent, or Firm—Harness, Dickey & Pierce, PLC

(57) ABSTRACT

In a flat-type blower unit disposed in a narrow space between a bottom portion of a front seat and a vehicle floor in a vertical direction, a motor-attachment bracket part for attaching a fan motor is integrally formed with a drive circuit cover part for covering a motor drive circuit to construct a motor attachment bracket having heat-generating components which generate heat when being operated. The motor attachment bracket is disposed to protrude radial outside from the fan motor, so that a dimension of the motor attachment bracket in the vertical direction can be reduced.

17 Claims, 18 Drawing Sheets

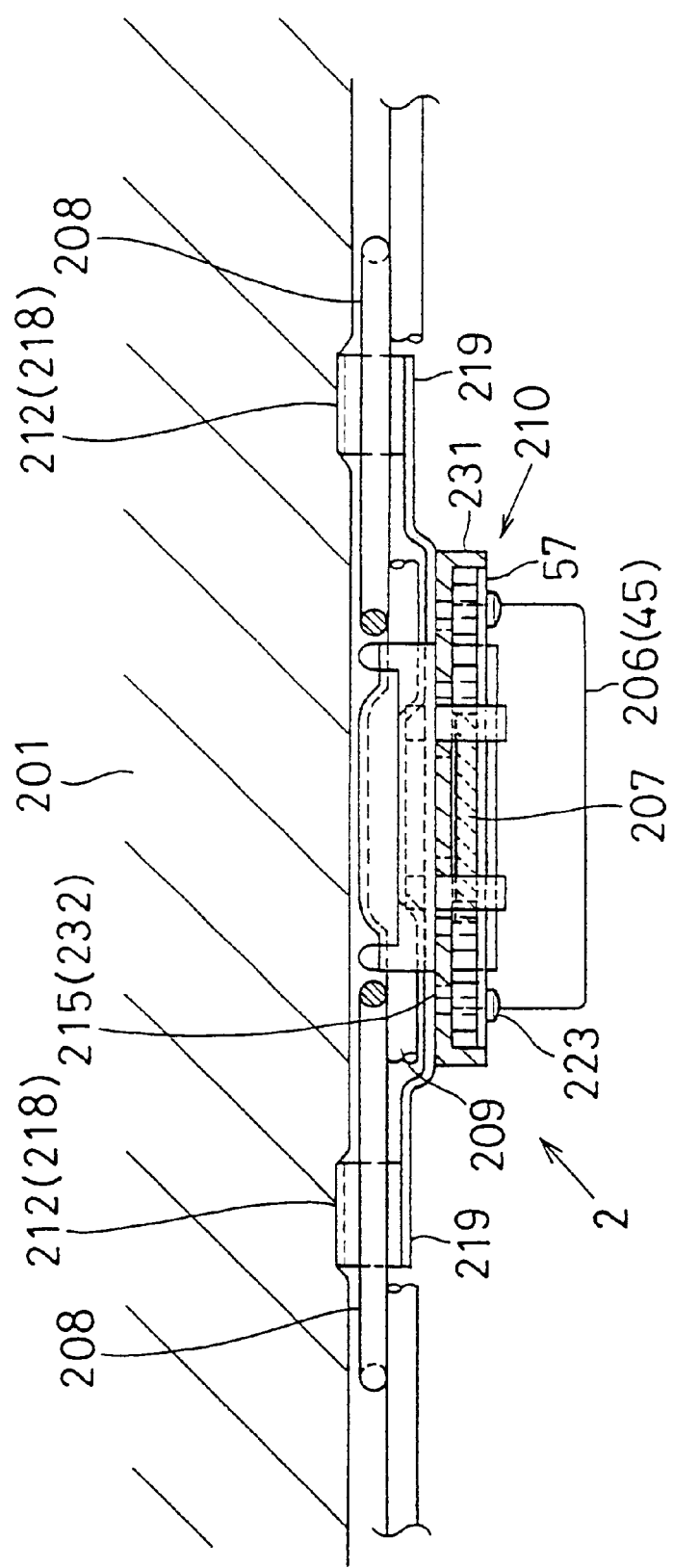

VEHICLE SEAT BLOWER UNIT WITH A MOTOR MOUNTED WITHIN A SCROLL HOUSING AND A COOLING MOTOR ATTACHMENT BRACKET

CROSS-REFERENCE TO RELATED APPLICATION

This application is related to Japanese Patent Applications No. 2001-112252 filed on Apr. 11, 2001, No. 2001-178969 filed on Jun. 13, 2001, and No. 2002-28455 filed on Feb. 5, 2002, the contents of which are hereby incorporated by reference.

BACKGROUND OF THE INVENTION

1. Field of the Invention

The present invention relates to a vehicle blower unit used in an installation space narrow in a vertical direction. More particularly, the present invention relates to a structure of a flat-type blower unit for a seat air conditioner, for introducing conditioned air in an air conditioning unit to a surface of a seat cushion.

2. Description of the Related Art

A blower unit 500 for blowing air toward a seat, shown in FIG. 21, has a brushless motor 501 for rotating a centrifugal fan, and a motor drive circuit 502 for controlling a rotational speed of the brushless motor 501 according to an input signal from an external microcomputer (not shown).

The brushless motor 501 is constructed by a stator 504 having three-phase armature windings 503, an outer rotor 506 having a plurality of permanent magnets 505, a rotary shaft 507 which rotates integrally with the outer rotor 506 and has a fan boss portion of a centrifugal fan screwed on its outer periphery, and the like. The motor drive circuit 502 has a circuit board 513 on which a plurality of MOS-FETs (switching device) 511 for sequentially passing a current through the three-phase armature windings 503 and electric parts 512 such as a smoothing capacitor are mounted. The circuit board 513 is covered by a drive circuit cover 514. Further, the drive circuit cover 514 is provided with a radiating heat sink 515 for radiating the heat of the plurality of MOS-FETs 511 into a unit case. The plurality of MOS-FETs 511 is forcibly cooled by cool air generated by the rotation of the centrifugal fan, at a downstream air side of the centrifugal fan.

However, in the above-described blower unit 500, the radiating heat sink 515 for radiating the heat generated by the plurality of MOS-FETs 511 into air is mounted to be exposed into the unit case, to be cooled by an air flow generated by the rotation of the centrifugal fan. Accordingly, the air flow in the unit case is disturbed, so that a high pressure loss causes, and an air-blowing amount is reduced. Further, since the radiating heat sink 515 is disposed to protrude into the unit case, a pressure pulsation is caused, and therefore, whiz noise may be caused. In addition, because the radiating heat sink 515 is used in the blower unit 500, the number of the components is increased in the blower unit 500, and cost of the blower unit 500 is increased.

SUMMARY OF THE INVENTION

In view of the foregoing problems, it is an object of the present invention to provide a vehicle blower unit in which a motor drive circuit is disposed to contact a motor attachment bracket so that the number of component parts can be reduced by using the motor attachment bracket as a radiating heat sink.

It is an another object of the present invention to provide a vehicle blower unit capable of realizing a low noise level by a cooling system using natural convection.

It is a further another object of the present invention to provide a vehicle blower unit capable of improving EMC and taking measures against EMI by covering the motor drive circuit with the motor attachment bracket.

It is a further another object of the present invention to provide a vehicle blower unit having a centrifugal fan, which can effectively reduce a noise level.

According to the present invention, in a vehicle blower unit having a fan and a motor for rotating the fan, a motor drive circuit for controlling a rotation speed of the motor has a heat-generating member which generates heat when being operated, a motor attachment bracket is disposed for attaching the motor to a unit case, and the motor drive circuit is disposed to contact the motor attachment bracket. Accordingly, by making the motor drive circuit abut against the motor attachment bracket, it is possible to use the motor attachment bracket as a radiating heat sink for radiating heat generated by the heat-generating member into air. Because an additional radiating heat sink is unnecessary and the motor attachment bracket can be used as the radiating heat sink for radiating heat to air, it is possible to reduce the number of component parts and the assemble steps. Therefore, it is possible to realize cost reduction and to improve mounting performance, in the vehicle blower unit.

Preferably, the motor attachment bracket is disposed to cover the motor drive circuit. Therefore, it is also possible to use the motor attachment bracket as a drive circuit cover for covering the motor drive circuit. Thereby, an additional drive circuit cover is unnecessary, so it is possible to reduce the number of component parts and the assembling steps. Further, noises radiated from the motor drive circuit can be effectively reduced by the motor attachment bracket used as the drive circuit cover.

Further, the motor attachment bracket is made of a metal material having a thermal conductivity higher than a predetermined conductivity. Therefore, by covering the motor drive circuit with the motor attachment bracket made of a metal material, it is possible to reduce radiant noises (to take measures against EMI). Further, by providing the motor drive circuit with an anti-EMI LC filter for preventing radio wave interference and an electric noise, it is possible to effectively suppressing the radio wave interference and the electric noise. That is, it is possible comparatively easily to improve EMC and to take measures against EMI.

Preferably, the motor attachment bracket is disposed outside the unit case along an outer wall surface of the unit case, to protrude radial outside from the motor. Therefore, a noise level can be reduced while the motor attachment bracket can be cooled outside the unit case using natural convection. Further, the unit case, the motor drive circuit and the motor attachment bracket are disposed to have a dimension smaller than a predetermined valve in a vertical direction. Therefore, the dimension of the blower unit in the vertical direction can be effectively reduced, and the blower unit can be readily mounted in a narrow space between a seat cushion of a vehicle seat and a floor of the vehicle. In this case, the blower unit can be effectively used for a vehicle seat.

Preferably, the heat-generating member includes a plurality of switching devices for passing a current through polyphase armature windings in sequence. By passing the current through the polyphase armature windings in sequence, a rotating magnetic field is generated in the motor.

Further, by controlling the rotating magnetic field in accordance with the relative rotational position and the rotational speed of a rotor, a permanent magnet disposed on the rotor is attracted by the rotating magnetic field to generate a torque. The motor drive circuit is electrically connected to one of a computer for sending a digital signal for controlling the rotational speed of the motor to the motor drive circuit, and a variable resistor for sending an analog signal for controlling the rotational speed of the fan motor to the motor drive circuit.

Preferably, the fan is a centrifugal fan having a plurality of blades around an axial direction of the centrifugal fan, the centrifugal fan is disposed such that air sucked in the axial direction is blown toward a radial outside, the unit case includes a scroll casing for accommodating the centrifugal fan, the scroll casing has a nose portion from which a scroll shape of the scroll casing starts, the centrifugal fan has a fan height (H) in the axial direction, and a ratio (H/D) of the fan height to a fan diameter (D) of the centrifugal fan is equal to or lower than 0.5. In addition, the centrifugal fan is disposed in the scroll casing to have a dimension between the centrifugal fan and the nose portion of the scroll casing in a radial direction, and the dimension is equal to or larger than 0.08 times of the fan diameter (D). Alternatively, the nose portion of the scroll casing has a curvature radius (R) that is equal to or larger than 0.08 times of the fan diameter (D). Accordingly, the noise level generated from the blower unit can be effectively reduced.

BRIEF DESCRIPTION OF THE DRAWINGS

Additional objects and advantages of the present invention will be more readily apparent from the following detailed description of preferred embodiments when taken together with the accompanying drawings, in which:

FIG. 12 is a front view showing the flat-type blower unit for seat air-conditioning, according to the fourth embodiment;

DETAILED DESCRIPTION OF THE PRESENTLY PREFERRED EMBODIMENTS

Figure 1A:
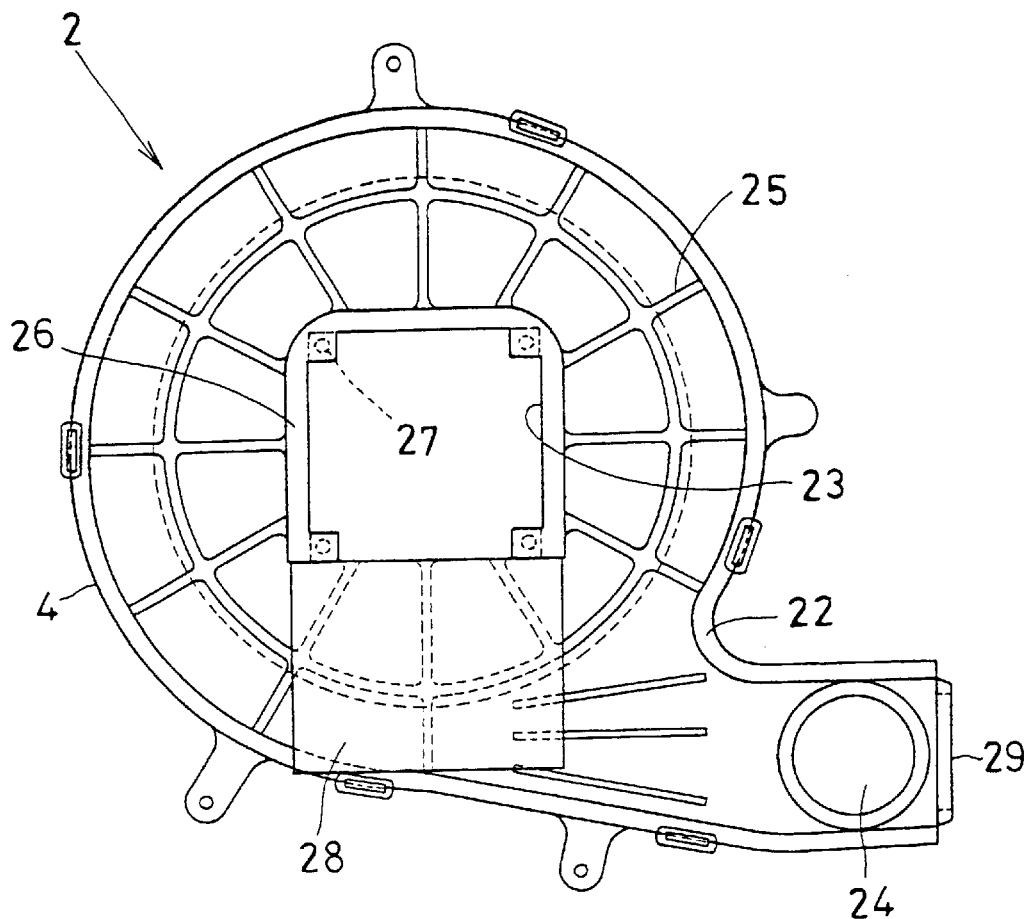
FIG. 1A is a plan view showing a structure of a flat-type blower unit for seat air-conditioning.
Figure 1B:
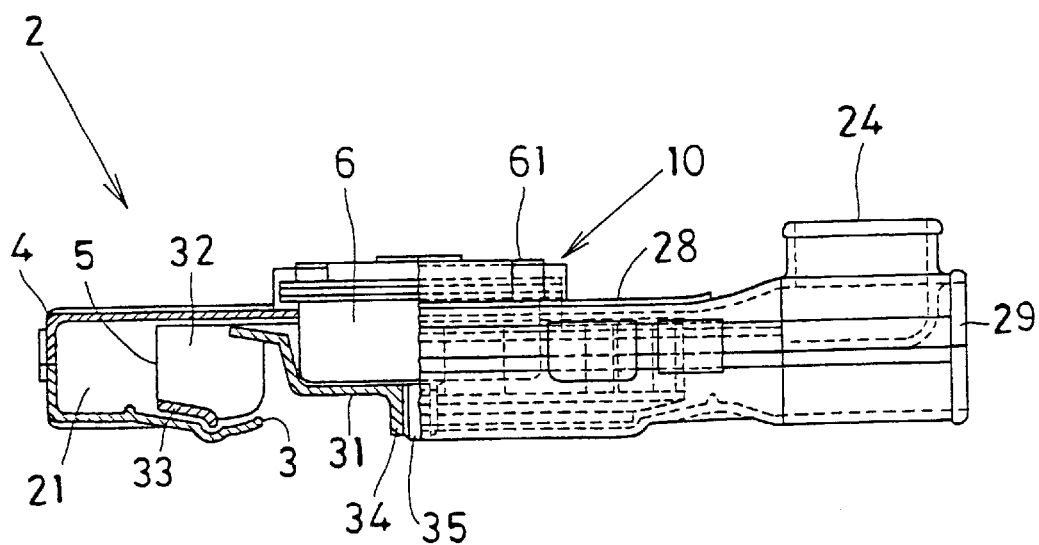
FIG. 1B is a partial sectional view showing the flat-type blower unit, according to a first embodiment of the present invention.

Preferred embodiments of the present invention will be described hereinafter with reference to the accompanying drawings.

A first embodiment of the present invention will be now described with reference to FIGS. 1A–5. A vehicle seat air conditioner according to the first embodiment includes a seat air-conditioning duct integrally mounted between a bottom portion of front seats 1 on the driver's seat side and on a front passenger's seat side and a floor of a vehicle, for guiding conditioned air in a front air conditioning unit to the surface of each front seat 1, and a flat-type blower unit 2 for generating an air flow toward the surface of the front seat 1 in the seat air-conditioning duct.

Each of the front seats 1 on the driver's seat side and the front passenger's seat side is constructed by a seat back 11 and a seat cushion 12 which are covered with outer skins (seat surface material) 13, 14 having air permeability. Further, in the seat back 11 and the seat cushion 12, air distribution ducts 15, 16 connected to communication ducts 8, 9 communicating with a unit case 4 are provided. A plurality of air passages (seat air-conditioning outlet ports) extending to the surfaces of the seat back 11 and the seat cushion 12 are branched from the air distribution ducts 15, 16. Here, a movable duct 18 is disposed in a middle part of the communication duct 8.

Each of the seat back 11 and the seat cushion 12 has a sponge layer on a surface of a urethane pad, and the surface of the sponge layer is covered with the outer skins 13, 14 such as leather or moquette. Under the seat cushion 12 shown in FIG. 2, a pair of seat rails fixed to the floor of the vehicle, a seat frame fixed to the seat rails and a seat spring fixed to the seat frame are provided.

The seat air-conditioning duct includes a movable duct 19 connected to an air downstream end of a seat air-blowing duct 17, and a unit case 4 connected to an air downstream end of the movable duct 19 and having an air suction port 3. Here, the seat air-blowing duct 17 is for supplying cool air or warm air to a passenger seated on the front seat 1 from, for example, an air conditioning duct of the front air conditioning unit. The seat air-blowing duct 17 has two duct parts extending toward a vehicle rear side from a vehicle front side of a passenger compartment along the floor of the vehicle. Here, the movable duct 19 is not necessarily connected to the air suction port 3 (which will be described later) of the unit case 4. That is, it is also possible to employ a system in which conditioned air to be blown into the passenger compartment from the air outlet port of the front air conditioning unit is made to flow under the front seat 1 and then is sucked into the unit case 4 from the air suction port 3.

Further, the air conditioning duct of the front air conditioning unit is provided with a cool air passage in which cool air cooled by a cooling heat exchanger flows, a warm air passage in which warm air heated again by a heating heat exchanger flows, and a passage switching door for selectively switching between the cool air passage and the warm air passage. In this manner, the cool air or the warm air in the front air conditioning duct is supplied to the seat air-blowing duct 17 from either the cool air passage or the warm air passage in the air conditioning duct.

The flat-type blower unit 2 for seat air-conditioning operation is disposed in an installation space which is comparatively narrow in a vertical direction between the front seat 1 on the driver's seat side or the front-passenger's seat side and the floor of the vehicle. The flat-type blower unit 2 includes a unit case 4 having the air suction port 3 at one end surface (e.g., bottom end surface in FIG. 1B) in the vertical direction, a centrifugal fan 5 for generating an air flow in an air passage 21 in the unit case 4 when it rotates, a brushless flat motor 6 (a fan motor of the present invention) for rotating the centrifugal fan 5, a motor drive circuit 7 for controlling the rotational speed of the brushless flat motor 6, and a motor attachment bracket 10 used as a radiating heat sink for radiating heat generated by heat-generating components (not shown) provided in the motor drive circuit 7 to air.

The unit case 4 is integrally formed by using a resin material in a predetermined shape, and is attached to a seat frame fixed to the bottom portion of the seat cushion 12 of the front seat 1. The unit case 4 constitutes a scroll casing forming the scroll-shaped air passage 21 that is scrolled from a nose portion 22 around the centrifugal fan 5. The unit case 4 has the air suction port 3 formed into a bell mouth shape at one end surface opposite to the floor of the vehicle. Further, the unit case 4 has a square through hole 23 through which the brushless flat motor 6 is mounted, and a communication hole 24 communicating with the above-mentioned communication duct 9, at the other end surface opposite to the seat frame and the seat spring of the seat cushion 12. The communication hole 24 is indicated on the vehicle front side of the unit case 4 in FIG. 2. However, as shown in FIG. 1A, actually, the communication hole 24 is formed in a top end surface on the vehicle rear side of the unit case 4.

Plural reinforcing ribs 25 radially or circularly projecting outside the unit case 4 are provided around the through hole 23. On the peripheral wall of the through hole 23, a motor attachment part 26 for attaching the brushless flat motor 6 and the motor drive circuit 7, and a cover attachment part 28 on which a drive circuit covering part 62 of the motor attachment bracket 10 is mounted, are provided. The motor attachment part 26 has a plurality of screw holes 27 (e.g., four in the present embodiment). A communication hole 29 communicating with the above-mentioned communication duct 8 is formed at the downstream air side of the unit case 4.

The centrifugal fan 5 is constituted by a bottom plate 31 to which the rotational force of the brushless flat motor 6 is transmitted, many blades 32 fixed to the outer peripheral end portion of the bottom plate 31, an annular holding ring 33 for holding the respective blades 32, and the like. A rotary shaft 35 of the brushless flat motor 6 is screwed and fastened into the fan boss portion 34 formed in the central portion of the bottom blade 31, so that the bottom blade 31 is fixed to the rotary shaft 35. In the bottom plate 31, the central portion having the fan boss portion 34 is depressed inside with respect to an outer peripheral portion so as to reduce the protrusion amount of the brushless flat motor 6 from the other end surface of the unit case 4. The blades 32 are formed into an approximate arc shape in cross section, and are arranged annularly at predetermined pitches on the outer peripheral portion of the bottom plate 31. The holding ring 33 connects the end portions of the respective blades 32 to each other, and holds the respective blades 32 at equal intervals.

The brushless flat motor 6 is a DC brushless motor constructed by a stator core fixedly pressed on the outer periphery of the central portion of the cylindrical shaft (not shown) fixed to the outer periphery of the rotary shaft 35 via a bearing, a stator having three-phase armature windings 41–43 wound around this stator core, and an outer rotor 45 having plural permanent magnets 44 on the inner peripheral surface opposite to the outer peripheral surface of the stator core. Here, three-phase armature windings 41–43 with Y-connection or Δ-connection are received in many slots formed on the outer periphery of the stator core. Further, the outer rotor 45 is fixed to the outer periphery of the rotary shaft 35 and is rotated integrally with the rotary shaft 35, to rotate the centrifugal fan 5.

Figure 4:
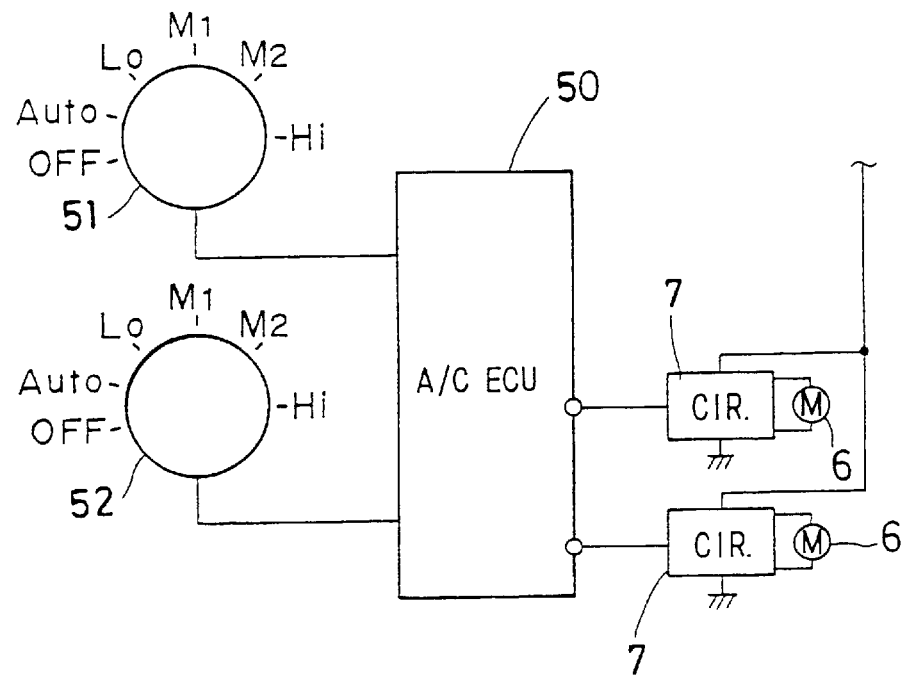
FIG. 4 is a schematic diagram showing a digital circuit in a vehicle seat air conditioner according to the first embodiment.

The motor drive circuit 7, as shown in FIG. 4, controls a timing for supplying electrical current to the three-phase armature windings 41–43 of each of the brushless flat motors 6 of the flat-type blower units 2 on the driver's seat side and the front passenger's seat side disposed under the bottom portions of the front seats 1 on the driver's seat side and the front passenger's seat side, on the basis of the duty ratio of a PWM control signal from an air conditioning control unit (hereinafter referred to as an air conditioning ECU) 50. The air conditioning ECU 50 controls an electrical current supplied to an actuator of each refrigerating unit, based on input signals such as switch signals from various switches on an air conditioning operation panel 53 and sensor signals from various sensors, and a predetermined program.

Figure 5:
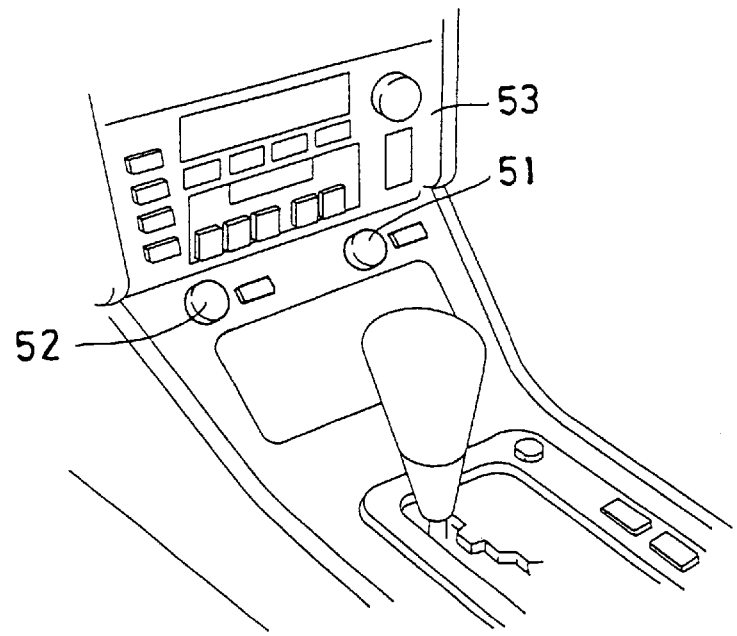
FIG. 5 is a perspective view showing seat air-volume setting controllers on a driver's seat side and a front-passenger's seat side, according to the first embodiment.

Further, the air conditioning ECU 50 is operated when an ignition switch or an accessory switch is turned on, and is a microcomputer including a CPU, a ROM, a RAM, an input/output circuit, an A/D converter, and a timer circuit. Here, as shown in FIG. 4 and FIG. 5, to the air-conditioning ECU 50, seat air-volume setting controllers (variable resistors) 51, 52 are connected. The seat air-volume setting controllers 51, 52 on the driver's seat side and the front passenger's seat side are air volume setting means on the driver' seat side and the front passenger's seat side for setting the volume (flow amount) of conditioned air blown to the passengers on the front seats by controlling the rotational speed of the respective brushless flat motors 6, that is, the rotation of centrifugal fans 5 of the flat-type blower units 2 on the driver's seat side and the front passenger's seat side. Then, the air conditioning ECU 50 outputs a PWM control (duty ratio control of pulse frequency) signal to the three-phase full-wave drive IC circuit 55 of the motor drive circuit 7 in response to voltage signals from the seat air volume setting controllers 51, 52.

The motor drive circuit 7 has a plurality of (in this example, three) non-contact type magnetic detecting devices such as hole devices or hole ICs, an inverter circuit made of a plurality of switching devices, the three-phase all-wave drive IC circuit 55 for controlling a current passing through the respective switching devices of the inverter circuit via an amplifier circuit based on a rotational position signal from the non-contact type magnetic detecting devices and a duty ratio of a PWM control signal from the air conditioning ECU 50, and an anti-EMI LC filter constructed by an electrolytic capacitor and a coil.

The anti-EMI LC filter is a LC filter for an EMC for preventing a AM/FM radio mounted on its own vehicle, a transceiver, or a personal wireless from generating radio noises (disturbing radio wave, noise radio wave) affecting the AM/FM radios of the other vehicles and the televisions of ordinary households, and for generating a stable output. The three-phase full-wave drive IC circuit 55 is a digital integrated circuit (IC) provided in an IC package 56 and is connected to a circuit board 57 on which various circuit components are arranged via a signal line 58. The circuit board 57 is arranged to extend in the horizontal direction perpendicular to the vertical direction, that is, along the outer wall surface of the other end surface of the unit case 4. Incidentally, the three-phase full-wave drive IC circuit 55 may be disposed in the drive circuit covering part 62 (described later).

The inverter circuit is for supplying electrical current to the three-phase armature windings 41–43 of the brushless flat motor 6, such that an electrical angle varies in sequence by a phase difference of 120° in accordance with the drive signal from the three-phase full-wave drive IC circuit 55. Incidentally, a transistor constituting the amplifier circuit and a plurality of MOS-FETs 75 (see FIG. 9) each constituting a switching device are heat-generating components which generate heat when they are operated. Further, the other heat-generating components (heat-generating member) in the motor drive circuit 7 are the three-phase full-wave drive IC circuit 55 and internal components (circuit components) which generate heat when a current is passed through them such as a resistor, a semiconductor and a coil. Here, a reference number 59 denotes a plurality of fastenings such as screws for fastening and fixing the IC package 56 to the outer side of the drive circuit covering part 62.

The motor attachment bracket 10 is also used as a radiating fin which is integrally formed by a metallic material (for example, aluminum alloy) having a high thermal conductivity into a predetermined shape. The motor attachment bracket 10 is disposed to cool the respective heat-generating components of the motor drive circuit 7 by natural convection, so that the heat from the heat-generating components is radiated to air. This motor attachment bracket 10 is integrally formed with a motor attachment bracket part 61 and the drive circuit covering part 62. The motor attachment bracket part 61 is for attaching the brushless flat motor 6 to the motor attachment part in a state where the brushless flat motor 6 is passed through the through hole 23 of the unit case 4. The drive circuit covering part 62 is placed on the top end surface of the cover attachment part 28 of the unit case 4, to cover the respective circuit components of the motor drive circuit 7. The IC package 56 in which the three-phase full-wave drive IC circuit 55 is built is placed on the motor attachment bracket 10, and is fastened thereto by the use of fastenings 59 such as screws. Further, the motor attachment bracket 10 is fastened and fixed to the circuit board 57 by the use of plural fastenings 64 (e.g., sixth) such as screws.

The motor attachment bracket 10 (drive circuit covering part 62) is disposed so as to protrude to the outer peripheral side of the brushless flat motor 6 outside in the radial direction, and is disposed outside the other end surface of the unit case 4 along the outer wall surface of the other end surface of the unit case 4. The height of the motor attachment bracket 10 is set lower than the maximum height of the circuit components of the motor drive circuit 7, and the surface area of the motor attachment bracket 10 (motor attachment bracket part 61 and the drive circuit covering part 62) is nearly equal to that of the circuit board 57 of the motor drive circuit 7. The motor attachment bracket 61 has a motor holding part 65 for holding a fixing member 46 for holding the stator core of the brushless flat motor 6, and is fastened and fixed to the motor attachment part 26 of the unit case 4 with the brushless flat motor 6 by the use of plural (in the present example, four) fastenings (not shown) such as screws. Incidentally, the motor attachment bracket 10 has plural screw holes 64*a* into which the plural fastenings 64 such as screws are screwed, and plural screw holes 66*a* into which plural fastenings 66 such as screws are screwed.

Next, the operation of the vehicle seat air conditioner according to the first embodiment will be now described. A PWM control signal, that is set at a duty ratio for obtaining an air amount (target rotational speed) corresponding to the set position of the seat air volume setting controllers (variable resistors) 51, 52 on the driver's seat side and the front passenger's seat side, is input to each of the motor drive circuits 7 on the driver's seat side and the front passenger's seat side from the air conditioning ECU 50. Then, the plural switching devices of the respective motor drive circuits 7 are operated in sequence to pass a current through the three-phase armature windings 41 to 43 of the brushless flat motor 6.

For example, when the current passes in sequence through the three-phase armature windings 41 to 43 so as to change the electric angle by a phase difference of 120°, a rotating magnetic field is generated in the brushless flat motor 6. By controlling this rotating magnetic field in accordance with the relative rotating position (output signal of the noncontact type magnetic detecting device) and a target rotational speed (the duty ratio of the PWM control signal from the air conditioning ECU 50), the permanent magnet 44 disposed at the outer rotor 45 is attracted by the rotating magnetic field to generate a rotational force (torque). Thereby, the outer rotor 45 is rotated and thus the centrifugal fan 5 is rotated at a predetermined rotational speed responsive to the target rotational speed.

Then, conditioned air such as warm air or cool air from a cool air passage or a warm air passage communicating with the air conditioning duct of the front air conditioning unit is sucked into the unit case 4 from the air suction port 3 through the seat air-blowing duct 17. Then, the conditioned air sucked into the unit case 4 is introduced into the fan boss part 34 at an approximate center of the centrifugal fan 5 and thereafter is discharged in the centrifugal direction of the centrifugal fan 5 by the rotation operation of the blades 32. Then, the conditioned air discharged in the centrifugal direction of the centrifugal fan 5 is blown into the communication ducts 8, 9 from the unit case 4 through the spiral air passage 21 in the unit case 4 and communication ports 29, 24.

The conditioned air flowing into the communication ducts 8, 9 is distributed to the respective air outlet passages through respective air distributing ducts 15, 16 provided in the seat backs 11 and the seat cushions 12 of the front seats 1 on the driver's seat side and the front passenger's seat side, and is blown to the thighs, hips and backs of the passengers seated on the front seats 1 on the driver's seat side and the front passenger's seat side through the surface skins 13, 14 from the respective air outlet passages. Accordingly, the conditioned air is directly blown to the bodies of the passengers seated on the front seats 1 on the driver's seat side and the front passenger's seat side, while conditioned air is blown from air outlets of the front air conditioning unit into the passenger compartment. Thus, air-conditioning feeling for the passengers seated on the front seats 1 can be improved.

At this time, the heat generated by the component circuits of the motor drive circuit 7 of the brushless flat motor 6, in particular, the inverter circuit for driving the three-phase armature windings 41 to 43 (the plurality of switching devices), the three-phase full-wave drive IC circuit 55 for operating these switching devices, and the heat-generating components of the internal components mounted on the circuit board 57 such as a resistor, a semiconductor and a coil is transmitted to the motor attachment bracket 10. Therefore, the heat-generating members are cooled by natural convection that is caused by the operation of expansion and contraction of the seat cushions 12 of the front seats 1, and a flow, in the passenger compartment, of conditioned air blown from the air outlet ports of the air conditioning duct of the front air conditioning unit.

As described above, in the flat-type blower unit 2 used for the vehicle seat air conditioner mounted in a narrow space in the vertical direction between the bottom portions of the front seats 1 on the driver's seat side and the front passenger's seat side and the floor of the vehicle, the motor attachment bracket 10 is used as the radiating heat sink, to radiate heat generated by the respective heat-generating components of the motor drive circuit 7 to air by the natural convection. In this manner, the motor attachment bracket part 61 for mounting the brushless flat motor 6 on the unit case 4, and the drive circuit covering part 62 contacting the respective heat-generating components of the motor drive circuit 7 to cover the respective component circuits of the motor drive circuit 7 can be constituted by a single member. Accordingly, it can reduce the number of component parts and the number needed to assemble the parts. As a result, cost reduction can be realized, while the flat-type blower unit can be readily mounted in a narrow space in the vertical direction.

The above-mentioned motor attachment bracket 10 is formed integrally with the drive circuit covering part 62. The drive circuit covering part 62 is made of a metal material having high thermal conductivity. The motor drive circuit 7 is covered with the drive circuit covering part 62 made of a metal material and is provided with the anti-EMI LC filter (electrolytic capacitor and coil) to prevent radio wave interference or electrical noises. Therefore, it is comparatively easily possible to improve the EMC (the capability of a circuit component in which the circuit component can function as expected without being affected by or affecting to the electromagnetic environment and without being degraded in function or causing a malfunction) and to take measures against the EMI (electromagnetic interference in which the functions of the circuit component are affected by electromagnetic environment).

Further, the motor attachment bracket 10 is mounted such that the height of the motor attachment bracket 10 is set lower than the maximum height of the circuit components of the motor drive circuit 7 and that the motor attachment bracket 10 hangs over outside the fan motor 6 in the radial direction (nearly horizontal direction perpendicular to the vertical direction). Accordingly, it is possible to extremely reduce the protrusion amount of the motor attachment bracket 10 in the vertical direction, in particular, toward the front seat 1 from the bottom wall surface of the unit case 4. Therefore, it is possible to realize the flat-type blower unit 2 which is flat in the vertical direction, and it is suitable for the flat-type blower unit to be mounted in the narrow space in the vertical direction.

Still further, since the motor attachment bracket part 61 and the drive circuit covering part 62 can be used on their areas as the radiating heat sink, the heat radiating area of the radiating heat sink can be greatly expanded. Therefore, it is possible to considerably improve the heat radiating capacity of the heat-generating components of the motor drive circuit 7. Further, since the motor attachment bracket 10 is mounted along the outer wall surface of the other end surface of the unit case 4 outside the air passage 21 of the unit case 4, the motor attachment bracket 10 can be cooled by the natural convection outside the other end surface of the unit case 4. Therefore, in the blower unit, it is possible to improve cooling efficiency and to obtain a sufficient cooling capacity.

Accordingly, the radiating heat sink can be eliminated from inside the air passage 21 of the unit case 4. Therefore, a pressure pulsation, caused by the turbulence of air flow such as the separation or adhesion of the air flow from or to the radiating heat sink, and an increase in pressure in the air passage 21 can be restricted, to thereby prevent a decrease in air volume and to reduce whizzing noises. As a result, a noise level can be effectively reduced. Further, even when the passenger seats on the front seat 1 so as to block the respective air outlet passages formed in the surface skins 13, 14 of the front seat 1 in a vehicle seat air conditioner, it is possible to realize a high output even in a vehicle seat air conditioner for performing seat air conditioning in an environment causing a high pressure loss.

Still further, since there is no need for providing a space for disposing the radiating heat sink in the air passage 21 of the unit case 4, the design of the unit case 4 can be optimized. That is, it is possible to optimally design the shape of the scroll casing in which the spiral air passage 21 is formed around the centrifugal fan 5 from the starting point of the nose part 22 and in which the air suction port 3 having the bell-mouth shape is formed on the one side in the axial direction of the centrifugal fan 5.

A second embodiment of the present invention will be now described with reference to FIGS. 6–8.

Figure 6:
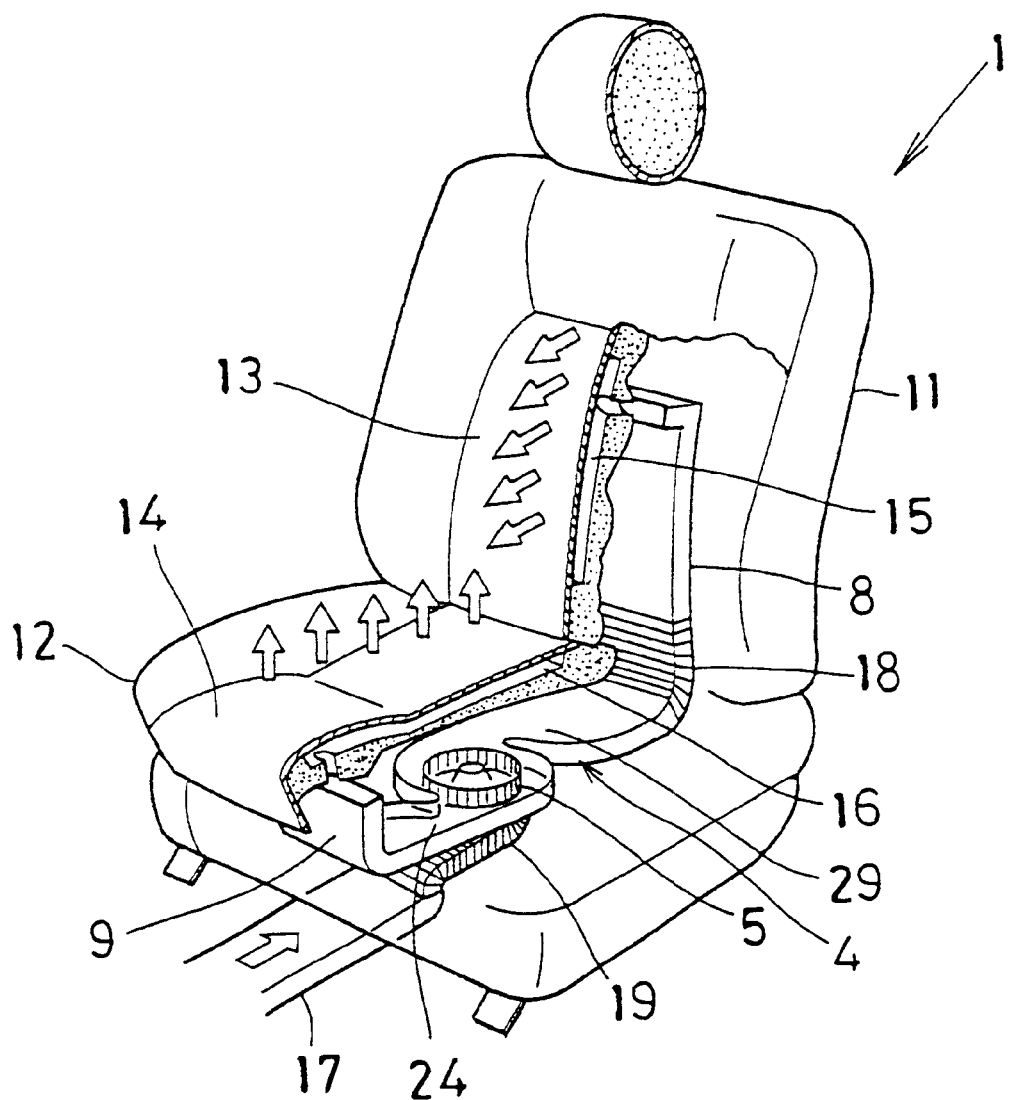
FIG. 6 is a perspective view showing a vehicle seat air conditioner according to a second embodiment of the present invention.
Figure 7A:
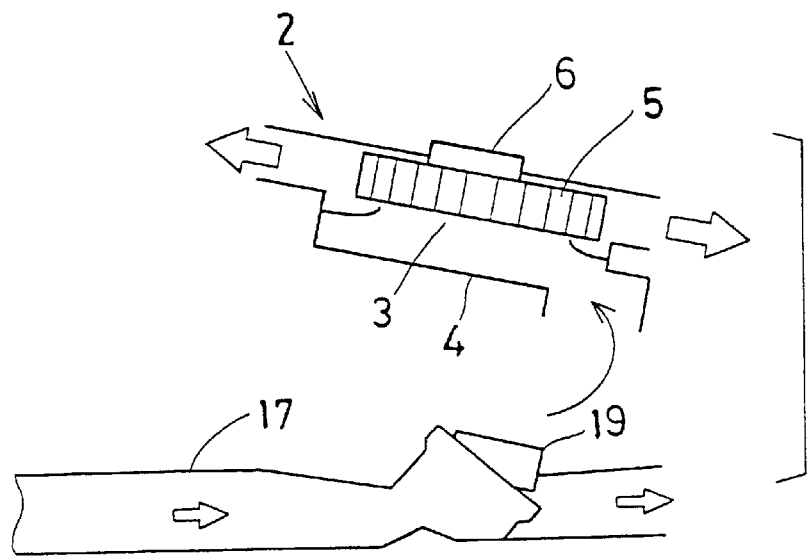
FIG. 7A is a schematic diagram of a flat-type blower unit for seat air-conditioning.
Figure 7B:
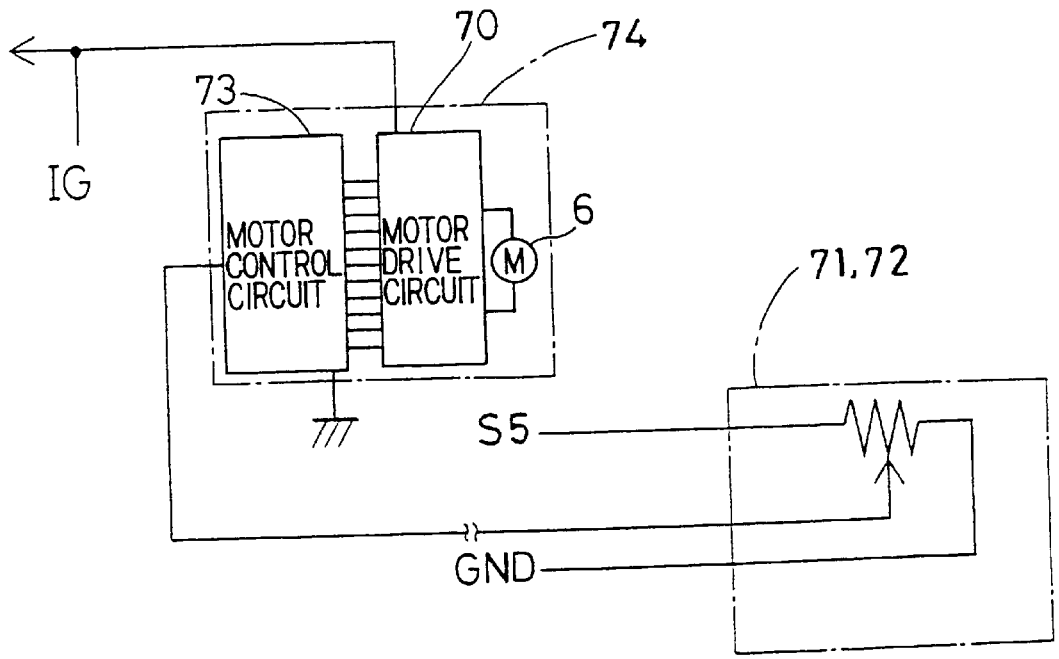
FIG. 7B is a schematic diagram showing an analog circuit of a vehicle seat air conditioner, according to the second embodiment.
Figure 8:
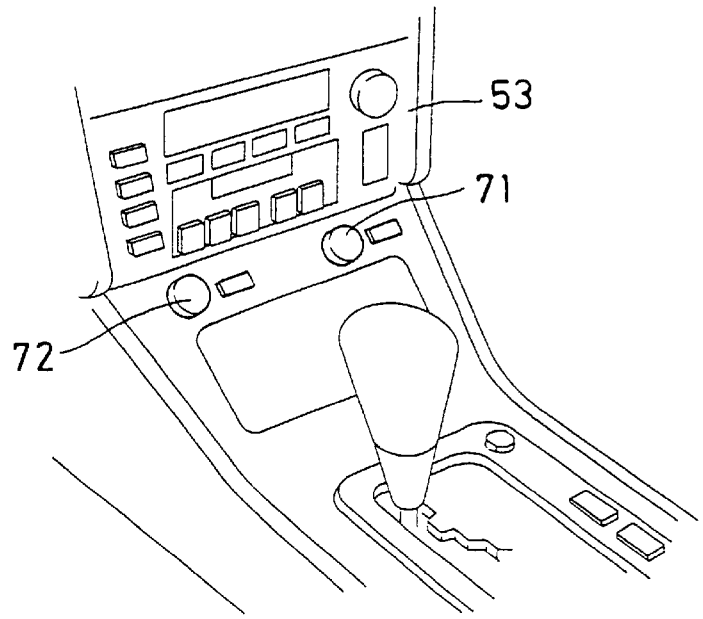
FIG. 8 is a perspective view showing seat air-volume setting controllers on a driver's seat side and a passenger's seat side, according to the second embodiment.

In the second embodiment, an air conditioning duct is constructed by a movable duct 19 connected to a downstream air side of a seat air blowing duct 17, and a unit case 4 having an air suction port 3 at a downstream air end of the movable duct 19, as shown in FIGS. 6 and 7A. A motor drive circuit 70 of the second embodiment is disposed in an analog circuit 74 to which an analog signal is applied from seat air volume setting controllers (variable resistors) 71, 72 via a motor control circuit 73. The air volume setting controllers 71, 72 are for setting the volume of conditioned air blown to the surfaces of front seats 1 on a driver's side and a front passenger's seat side, respectively. Incidentally, a voltage signal (analog signal) VCD is applied to the motor control circuit 73 from the seat air volume setting controllers 71, 72. In FIG. 7B, S5 indicates a power voltage of 5V, and IG denotes an ignition switch.

In the second embodiment, the movable duct 19 is connected to the unit case 4 as shown in FIG. 7A. In the second embodiment, the other parts are similar to those of the above-described first embodiment. Accordingly, in the second embodiment, the advantages described in the first embodiment can be obtained.

Figure 9:
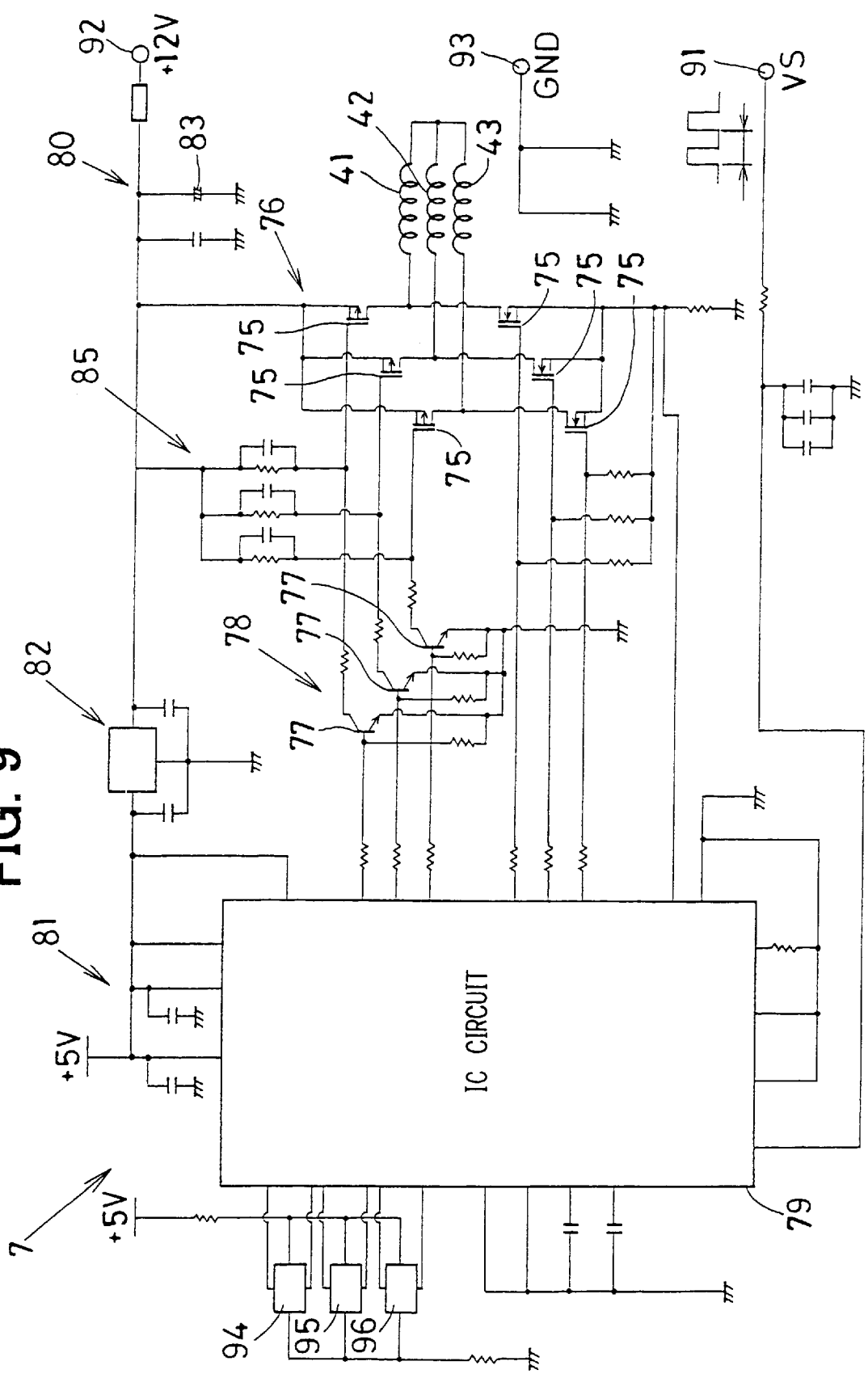
FIG. 9 is a circuit diagram showing a motor drive circuit of a vehicle seat air conditioner, according to a third embodiment of the present invention.

A third embodiment of the present invention will be now described with reference to FIG. 9. In the third embodiment, the motor drive circuit 7 of the above-described first embodiment will be now described in detail. As shown in FIG. 9, a brushless flat motor for rotating a centrifugal fan is a DC brushless motor constructed by a stator having three-phase armature windings 41–43, an outer rotor having a permanent magnet on the inner peripheral surface and the like. In the third embodiment, the motor drive circuit 7 is provided with plural hole devices 94–96 (e.g., three), an inverter circuit 76 constituted by plural MOS-FETs 75, and a three-phase full-wave drive IC circuit 79 for switching the plurality of MOS-FETs 75 of the inverter circuit 76 via an amplifier circuit 78 constituted by plural transistors 77.

Further, the motor drive unit 7 is provided with an anti-EMI LC filter 80 including an electrolytic capacitor 83 and a coil, a circuit 81 for preventing a rush current, an IC circuit 82, and an RC circuit 85 constituted by a plurality of capacitors and resistors and for preventing a variation in torque of an outer rotor. Further, the motor drive circuit 7 is provided with a signal input (VS) terminal 91 for inputting a PWM control signal, a battery (+12V) terminal 92 electrically connected to a vehicle power source (battery) of 12 V via an ignition switch, and a grounded (GND) terminal 93. Here, +5V means a power source voltage of 5V.

The hole devices 94–96 are position detecting means for detecting the relative rotational positions of the three-phase armature windings 41–43 with respect to the direction of a magnetic flux generated by the permanent magnet disposed on the inner peripheral surface of the outer rotor, and are arranged opposite to the inner peripheral side of the permanent magnet of the outer rotor, so that a voltage corresponding to a component perpendicular to the magnetic flux applied to their induced surfaces is generated. In other words, the hole devices 94 to 96 are provided such that when a north polar magnetic field or a south polar magnetic field is generated in their induced surfaces, they are induced by the magnetic field to produce an electromotive force (when a north polar magnetic field is generated, a plus potential is produced and when a south polar magnetic field is generated, a minus potential is produced). The three-phase full-wave drive IC circuit 79 controls an electrical current passing through the plurality of MOS-FETs 75 in sequence based on the rotational position signal from the plural hole devices 94 to 96 and the duty ratio of the PWM control (VS) signal from an air conditioning ECU.

As described in the first embodiment, the plural transistors 77 constituting the amplifier circuit 78 for amplifying a drive signal from the three-phase full-wave drive IC circuit 79, and the plural MOS-FETs 75 constituting the inverter circuit 76 for passing a current through the three-phase armature windings 41–43 of the brushless flat motor 6 in sequence so as to vary an electrical angle by a phase difference of 120° are heat-generating components which generate heat when they are operated. In addition to these components, the other heat-generating components in the motor drive circuit 7 are the three-phase full-wave drive IC circuit 79 and internal components (circuit components) such as a resistor, a semiconductor, a coil and the like, as shown in the circuit diagram shown in FIG. 9. The motor drive circuit 7 having such a constitution can be applied to both of the replacement of voltage based on the duty ratio of the PWM control signal (digital signal) from the air conditioning ECU, and the manual control of a voltage signal (analog signal) from the seat air volume setting controllers (variable resistors) 71, 72.

A fourth preferred embodiment of the present invention will be now described with reference to FIGS. 10–12.

A flat-type blower unit 2 in the fourth embodiment is disposed in an installation space relatively narrow in the vertical direction between the seat cushions 201 (hereinafter referred to as a urethane pad) of the front seats on a driver's seat side and a front passenger's seat side and the floor of a vehicle. This flat-type blower unit 2 is constituted by a unit case 203 having an air suction port 202 formed at one end surface (bottom end surface in the drawing) in the vertical direction, a centrifugal fan for generating an air flow in an air passage in the unit case 203 when it rotates, a brushless flat motor 206 for rotating the centrifugal fan (which corresponds to a fan motor of the present invention), a motor drive circuit 207 for controlling the rotational speed of the brushless flat motor 206, and a motor attachment bracket 210 used as a radiating heat sink for radiating heat generated by the heat-generating components provided in the motor drive circuit 207 into air.

In the fourth embodiment, a urethane pad 201 on the front seat, a seat spring 208, a stabilizer 209, the motor attachment bracket 210, the motor drive circuit 207, the unit case 203, and the brushless flat motor 206 are arranged in this order from the front seat side to the floor of the vehicle. Similarly to the first embodiment, the unit case 203 is divided into two case parts formed of a resin material into a predetermined shape and constitutes a scroll casing in which a spiral (scroll-shaped) air passage is formed around the centrifugal fan from a starting point at a nose part.

Figure 2:
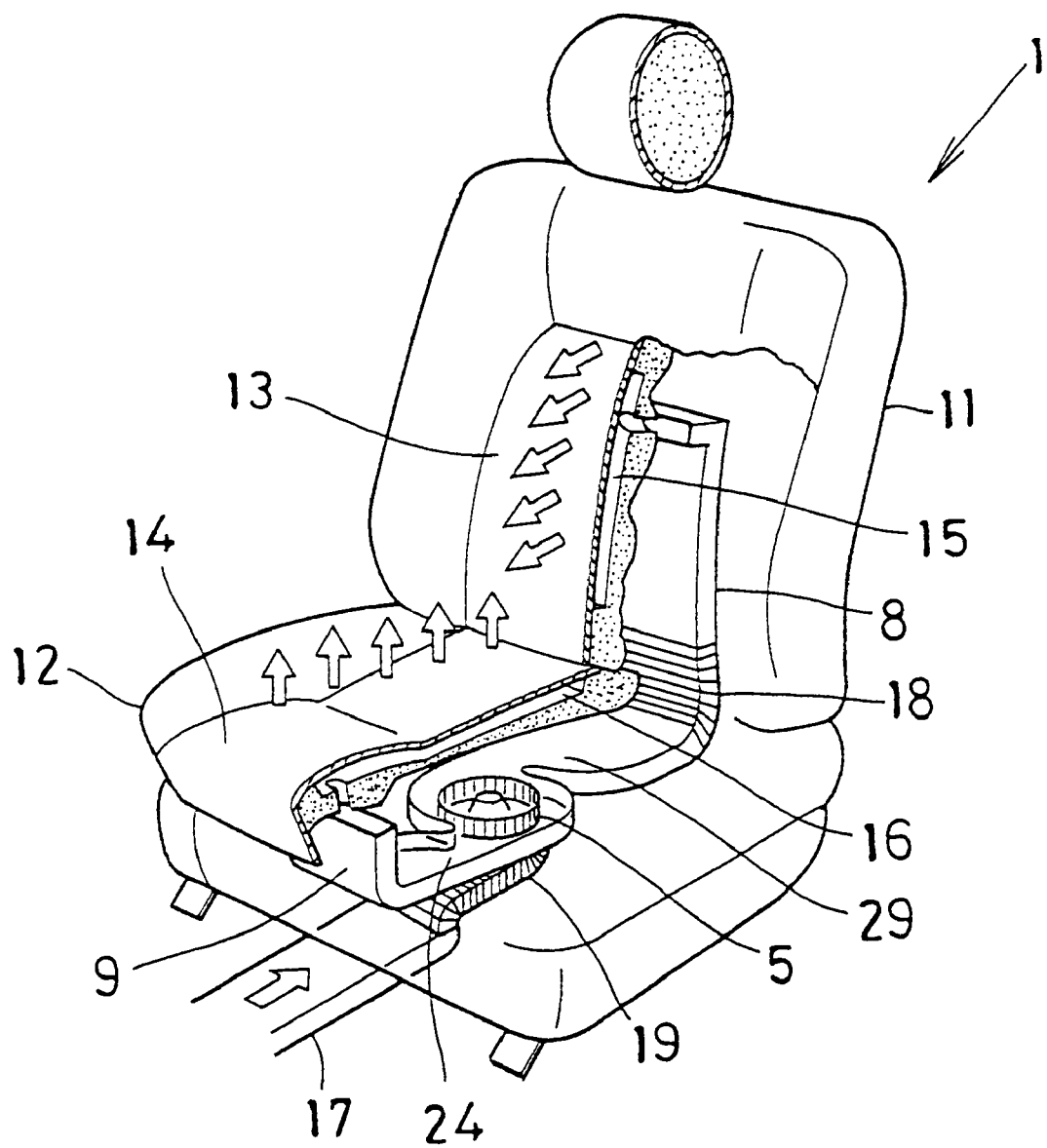
FIG. 2 is a perspective view showing a vehicle seat air conditioner according to the first embodiment.
Figure 3A:
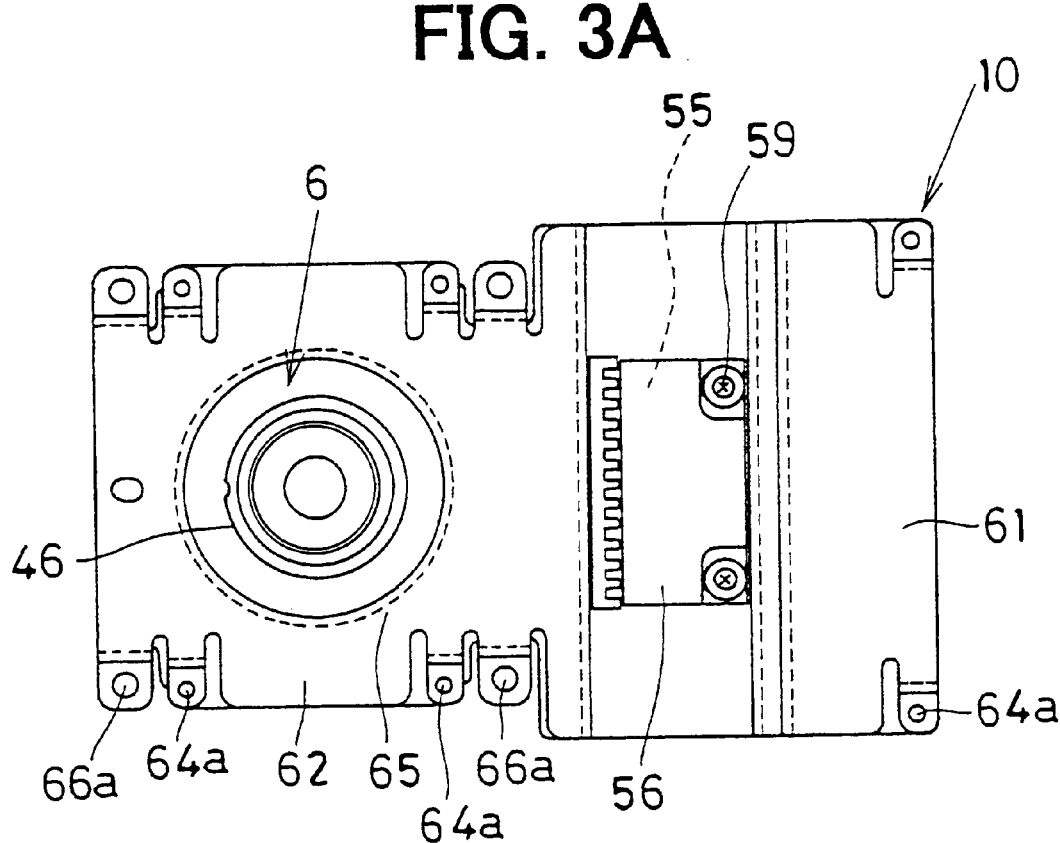
FIG. 3A is a plan view showing a brushless flat motor and a motor attachment bracket.
Figure 3B:
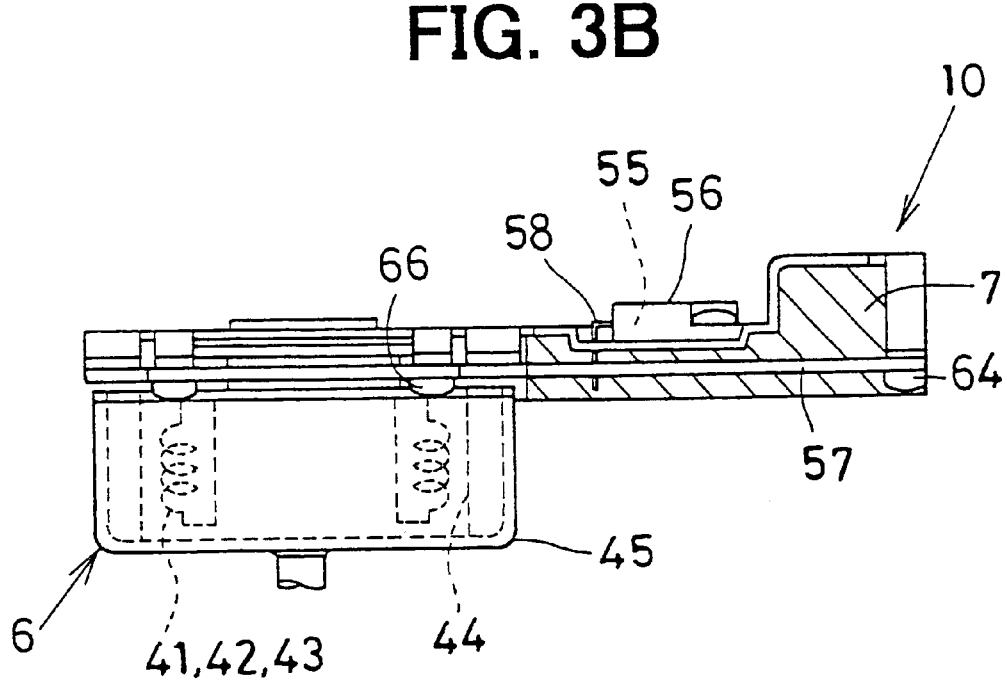
FIG. 3B is a side view showing the brushless flat motor and the motor attachment bracket, according to the first embodiment.

Then, in the upper side case part of the unit case 203, a rectangular through hole through which the brushless flat motor 206 is provided. Around the through hole, reinforcing ribs 225 radially or circularly projecting outside the unit case 4 are formed. Further, on the upper side case part of the unit case 203, there is provided a cover attachment part 228 on which the drive circuit covering part 215 (which will be described later) of the motor attachment bracket 210 is mounted. In the end portion of the upper side case part of the unit case 203, a connection port 204 connected to the movable duct 18 shown in FIG. 2 and FIG. 6 is provided.

Similarly to the first embodiment, the brushless flat motor 206 is a DC brushless motor provided with a stator core, a stator, and an outer rotor 45. The outer rotor 45 is fixed to the outer periphery of a rotary shaft (not shown), and is rotated integrally with the rotary shaft to rotate a centrifugal fan, similarly to the first embodiment. The motor drive circuit 207 has a circuit structure similar to that, for example, the motor drive circuit 7 shown in FIG. 9. For example, the motor drive circuit 207 is constructed by a power transistor for controlling a large current and a MOS-FET constituting a plurality of switching devices, and is disposed on a circuit board 57 mounted on the unit case 203. Incidentally, the heat-generating components include the power transistor, the MOS-FET, the three-phase full-wave drive IC circuit, and circuit components such as resistor, semiconductor and coil.

The motor attachment bracket 210 is formed by a metal material having a high thermal conductivity (for example, aluminum alloy) into a predetermined shape. The motor attachment bracket 210 is a heat radiating fin used as both of a motor attachment bracket and a seat unit mounting bracket for radiating heat generated by the respective heat-generating components of the motor drive circuit 207 into air by the natural convection. The motor attachment bracket 210 is constructed by seat-attachment bracket parts 212 each of which is hung over a seat spring 208 via a felt 211, a seat-attachment bracket part 214 which is hung over a stabilizer 209 via a felt 213, a drive circuit covering part 215 which is disposed on the top end surface, in the drawing, of the cover attachment part 228 of the upper side case part of the unit case 203 and covers the respective circuit components of the motor drive circuit 207, and the like.

Figure 10:
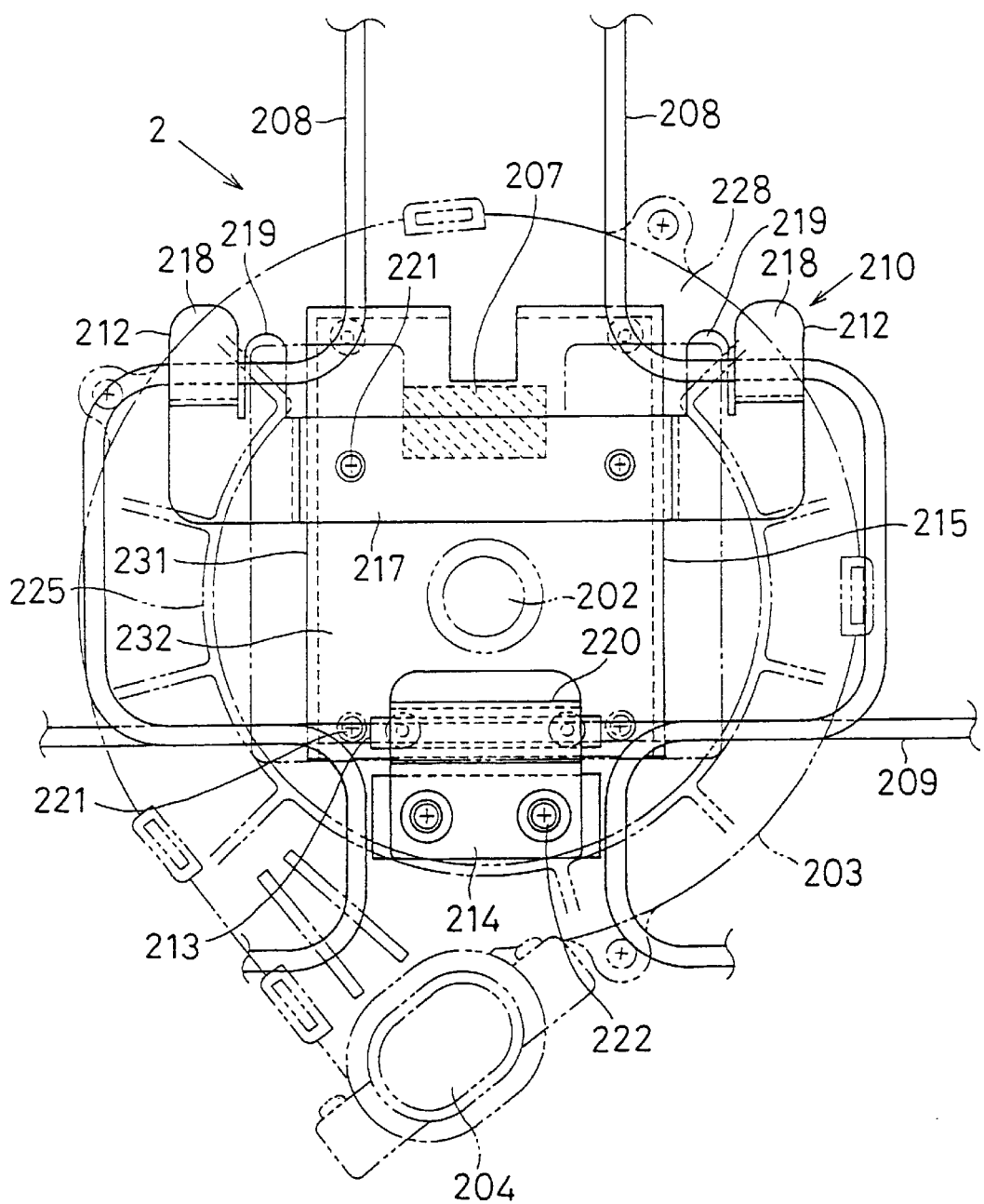
FIG. 10 is a plan view showing a flat-type blower unit for seat air-conditioning, according to a fourth embodiment of the present invention.

The seat-attachment bracket parts 212, as shown in FIG. 10, are disposed on both sides of a connection part 217 integrally fixed to the top wall part 232 of the drive circuit covering part 215, respectively. As shown in FIG. 10 and FIG. 11, each of the seat-attachment bracket parts 212 has a top end side retaining part 218 for retaining the top end side, in the drawing, of the seat spring 208 and a bottom end side retaining part 219 for retaining the bottom end side, in the drawing, of the seat spring 208. Further, each of the seat-attachment bracket parts 212 is constructed to be held by the seat spring 208 by sandwiching the seat spring 208 between the top end side retaining part 218 and the bottom end side retaining part 219 via the felt 211. Incidentally, the top end side, in the drawing, of the top end side retaining part 218, as shown in FIG. 12, is disposed to contact the bottom surface in the drawing of the urethane pad 201 of the front seat. The felts 211, 213 are made of a shock absorbing material capable of absorbing the deflection of the seat spring 208 and the stabilizer 209.

Plural fastening portions for mounting the brushless flat motor 206 on the unit case 203 by the use of plural fastenings 221 such as screws are formed on the connection part 217 between the plural seat-attachment bracket parts 212 and the drive circuit covering part 215, and on the top wall part 232 of the drive circuit covering part 215. Further, the seat-attachment bracket part 214 is mounted as a separate part on the drive circuit covering part 215.

In the seat-attachment bracket part 214, a plurality of fastening portions for attaching the upper side case part of the unit case 203 by the use of a plurality of (in the present example, two) of fastenings such as screws are provided. The seat-attachment bracket part 214 has a curved portion 220, which can be fitted to the cylindrical felt 213 fitted onto the stabilizer 209. The stabilizer 209 is sandwiched between the curved portion 220 and the top wall part 232 of the drive circuit covering part 215 via the felt 213, so that the seat-attachment bracket part 214 is held by the stabilizer 209.

The drive circuit covering part 215 is integrally formed by a metal material having a high thermal conductivity (for example, aluminum alloy) into a predetermined shape, and is also used as a motor attachment bracket for mounting the brushless flat motor 206 on the upper side case part of the unit case 203. The drive circuit covering part 215 is mounted such that the respective heat-generating components of the motor drive circuit 207 abut against the drive circuit covering part 215, and in such a way as to cover the respective circuit components of the motor drive circuit 207.

Figure 11:
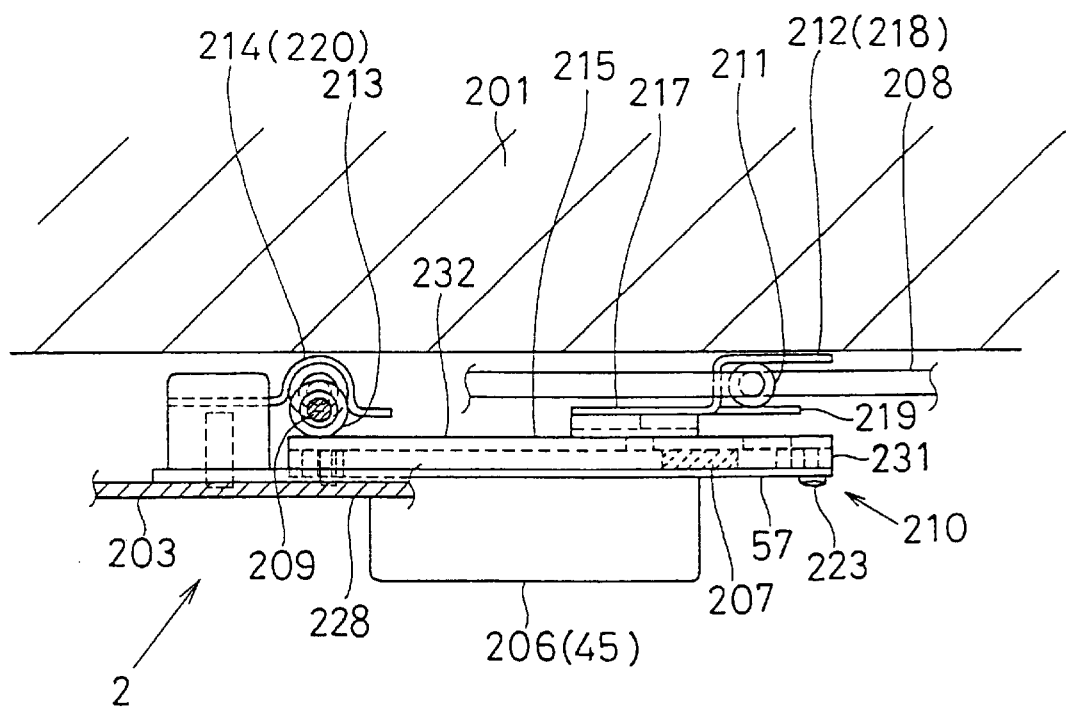
FIG. 11 is a side view showing the flat-type blower unit for seat air-conditioning, according to the fourth embodiment.

In the drive circuit covering part 215, a projecting wall part 231 is provided so as to surround the periphery of the circuit board 57 except for a portion where a connector (not shown) is mounted, and to project downward in FIG. 11. The projecting wall part 231 and the top wall part 232 prevent the AM/FM radio of its own vehicle, a transceiver, and a personal wireless from radiating the radio wave noises (disturbing radio wave, noise radio wave) affected to the AM/FM radios of the other vehicles and the televisions of ordinary households. The top wall part 232 of the drive circuit covering part 215 has a plurality of fastening portions where the circuit board 57 is mounted on the top wall part 232 from the bottom side (lower side in FIG. 11) by the use of a plurality of (in the present example, four) fastenings such as screws.

As described above, in the flat-type blower unit 2 used for the vehicle seat air conditioner mounted in the installation space narrow in the vertical direction between the bottom portions of the front seats 1 on the driver's seat side and the front passenger's seat side and the floor of the vehicle, the motor attachment bracket 210 is provided to be used as a radiating heat sink, to radiate heat generated by the respective heat-generating components of the motor drive circuit 7 into air by the natural convection, so that the heat-generating components of the motor drive circuit 7 is cooled. The seat-attachment bracket part 212 is for attaching the flat-type blower unit 2 on the lower portion of the urethane pad 201 of the front seat, and the drive circuit covering part 215 for covering the circuit components of the motor drive circuit 7 is also used as a motor attachment bracket for mounting the brushless motor 206 on the unit case 206, to contact the respective heat-generating components of the motor drive circuit 7. In the fourth embodiment of the present invention, the seat-attachment bracket part 212 and the drive circuit covering part 215 can be formed by a single part. Accordingly, the number of component parts and the number of assemble steps can be reduced, and thus it can realize cost reduction and improve mounting performance.

Further, in the fourth embodiment, the same effect as the first embodiment can be obtained. Incidentally, in the fourth embodiment, the seat-attachment bracket part 214 is disposed as separate part relative to the drive circuit covering part 215. However, the seat-attachment bracket part 214 and the drive circuit covering part 215 may be integrally formed by a metal material. Further, in the fourth embodiment, the seat-attachment bracket part 212 and the drive circuit covering part 215 are integrally formed by the metal material. However, the seat-attachment bracket part 214 may be provided as a separate part relative to the drive circuit covering part 215.

A fifth embodiment of the present invention will be now described with reference to FIGS. 13A and 13B. A unit case 300 of a flat-type blower unit 2 according to the fifth embodiment is constructed by a main body case 301 integrally formed by a resin material into a predetermined shape, and a motor attachment bracket 310 which also serves as a seat-attachment bracket part, an upper side case part, and a radiating heat sink for a motor drive circuit. In the fifth embodiment, a urethane pad of a front seat, a seat spring, a stabilizer, the motor attachment bracket 310, a motor drive circuit 307, a brushless flat motor 306, and the main body case 301 are arranged in this order from the seat side where a passenger is seated, to the floor side of a vehicle.

The main body case 301 constructs a scroll casing in which a spiral (scroll-shaped) air passage 304 is formed around a centrifugal fan 305 from a starting point of a nose part. In the main body case 301, an air suction port 311 having a bell-mouth shape is formed in one end surface opposed to the floor of the vehicle. Further, the main body case 301 is provided with a connection pipe 312 connected to the movable duct 18 in FIG. 2 and FIG. 6. On the outer periphery of the connection pipe 312, a plurality of collar-shaped parts 313 for preventing the movable duct 18 from withdrawing are provided.

The centrifugal fan 305 is constituted by a bottom plate 314 to which the rotational force of a brushless flat motor 306 is transmitted, plural blades 315 fixed to the outer peripheral end portion of the bottom plate 314, an annular holding ring 316 for holding the respective blades 315. In the bottom plate 314, the outer rotor 45 of the brushless flat motor 306 is fitted. Further, the brushless flat motor 306 is a DC brushless motor provided with a stator core, a stator, and the outer rotor 45, similarly to the above-described fourth embodiment.

The motor drive circuit 307 has a circuit structure similar to, for example, that of the motor drive circuit 7 shown in FIG. 9, and is constituted, in particular, by a power transistor for controlling a large current and a MOS-FET constituting a plurality of switching devices. The motor drive circuit 307 is placed on a circuit board 57 fixedly fastened to the bottom surface, in the drawing, of the motor attachment bracket 310. Incidentally, the heat-generating components include the power transistor, the MOS-FET, a three-phase full-wave drive IC circuit, and circuit components such as a resistor, a semiconductor, a coil and the like.

The motor attachment bracket 310 is formed by a metal material having a high thermal conductivity (for example, aluminum alloy) into a predetermined shape. The motor attachment bracket 310 is constructed by seat-attachment bracket parts 321 each of which is hung over the seat spring via a felt, a seat-attachment bracket part 322 which is hung over the stabilizer via a felt, and an upper side case part 323 (motor attachment bracket part, drive circuit covering part) which also serves as a motor attachment bracket and a radiating heat sink for the motor drive circuit.

Figure 13A:
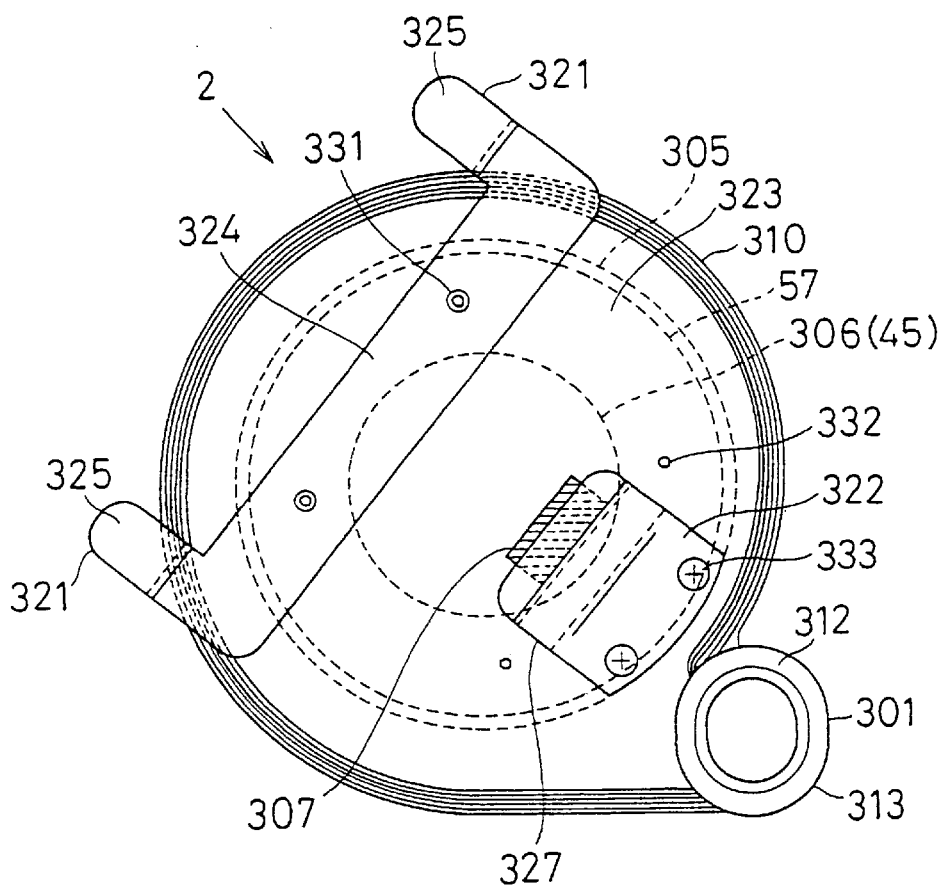
FIG. 13A is a plan view showing a flat-type blower unit for seat air-conditioning operation.
Figure 13B:
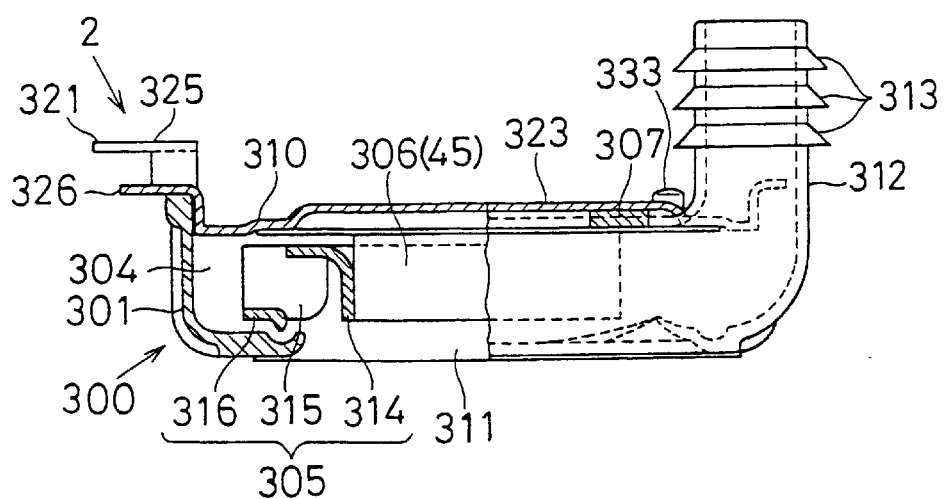
FIG. 13B is a side view showing the flat-type blower unit, according to a fifth embodiment of the present invention.

The seat-attachment bracket parts 321, as shown in FIG. 13A, are disposed on both sides of a connection part 324 integrally fixed to the upper side case part 323, respectively. Each of the seat-attachment bracket parts 321 has a top end side retaining part 325 for retaining the top end side, in the drawing, of the seat spring, and a bottom end side retaining part 326 for retaining the bottom end side, in the drawing, of the seat spring. Further, each of the seat-attachment bracket parts 321 is constituted so as to be held by the seat spring by sandwiching the seat spring between the top end side retaining part 325 and the bottom end side retaining part 326 via the felt. Incidentally, the top end surface, in the drawing, of the top end side retaining part 325 is provided so as to contact the bottom surface of the urethane pad 201 of the front seat, similarly to the above-described fourth embodiment.

Plural fastening portions 331, 332 for attaching the brushless flat motor 306 to the upper side case part 323 by the use of plural fastenings (e.g., four) such as screws (not shown) are formed in a connection part 324 disposed between the seat-attachment bracket parts 321 and the upper side case part 323, and are formed in the upper side case part 323. Further, the seat-attachment bracket part 322 is provided as a separate part relative to the upper side case part 323.

Plural fastening portions for attaching the circuit board 57 by the use of plural fastenings 333 (e.g., two) such as screws are formed in the seat-attachment bracket part 322. The seat-attachment bracket part 322 is provided with a curved portion 327 which can be fitted onto a cylindrical felt fitted on the stabilizer. By sandwiching the stabilizer between the curved portion 327 and the upper side case part 323 via the felt, the seat-attachment bracket part 322 is held by the stabilizer.

The upper side case part 323 is integrally formed by a metal material having a high thermal conductivity (for example, aluminum alloy) into a predetermined shape, is disposed to contact the respective heat-generating components of the motor drive circuit 307 abut against the upper side case part 323, and is disposed on the circuit board 57 in the state where its central portion is expanded upward, in the drawing, with respect to its peripheral portion so as to receive the respective circuit components between itself and the circuit board 57. Incidentally, the collar-shaped portions projecting outside from the peripheral portion of the upper side case part 323 are fixedly fastened to the outer peripheral wall part of the main body case 301 by the use of fastenings such as screws or the like (not shown), or are fixedly fitted thereto by a tight fit.

As described above, the motor attachment bracket 310 functioning as the radiating heat sink for radiating heat generated by the heat-generating components of the motor drive circuit 307 into air by the natural convection is constructed by the seat-attachment bracket part 321, and the upper side case part 323. Further, the upper side case part 323 also serves as the motor attachment bracket and the radiating heat sink for the motor drive circuit. Therefore, it is possible to further reduce the number of the component parts and the number of assemble steps, as compared with the fourth embodiment. Accordingly, cost reduction can be obtained, and mounting performance of the flat-type blower unit can be further improved.

A sixth embodiment of the present invention will be now described with reference to FIGS. 14–20. In the sixth embodiment, the present invention is typically applied to a seat blower unit disposed under a vehicle seat so that conditioned air is directly blown to a passenger on the vehicle seat from a seat cushion and a seat back.

Figure 14:
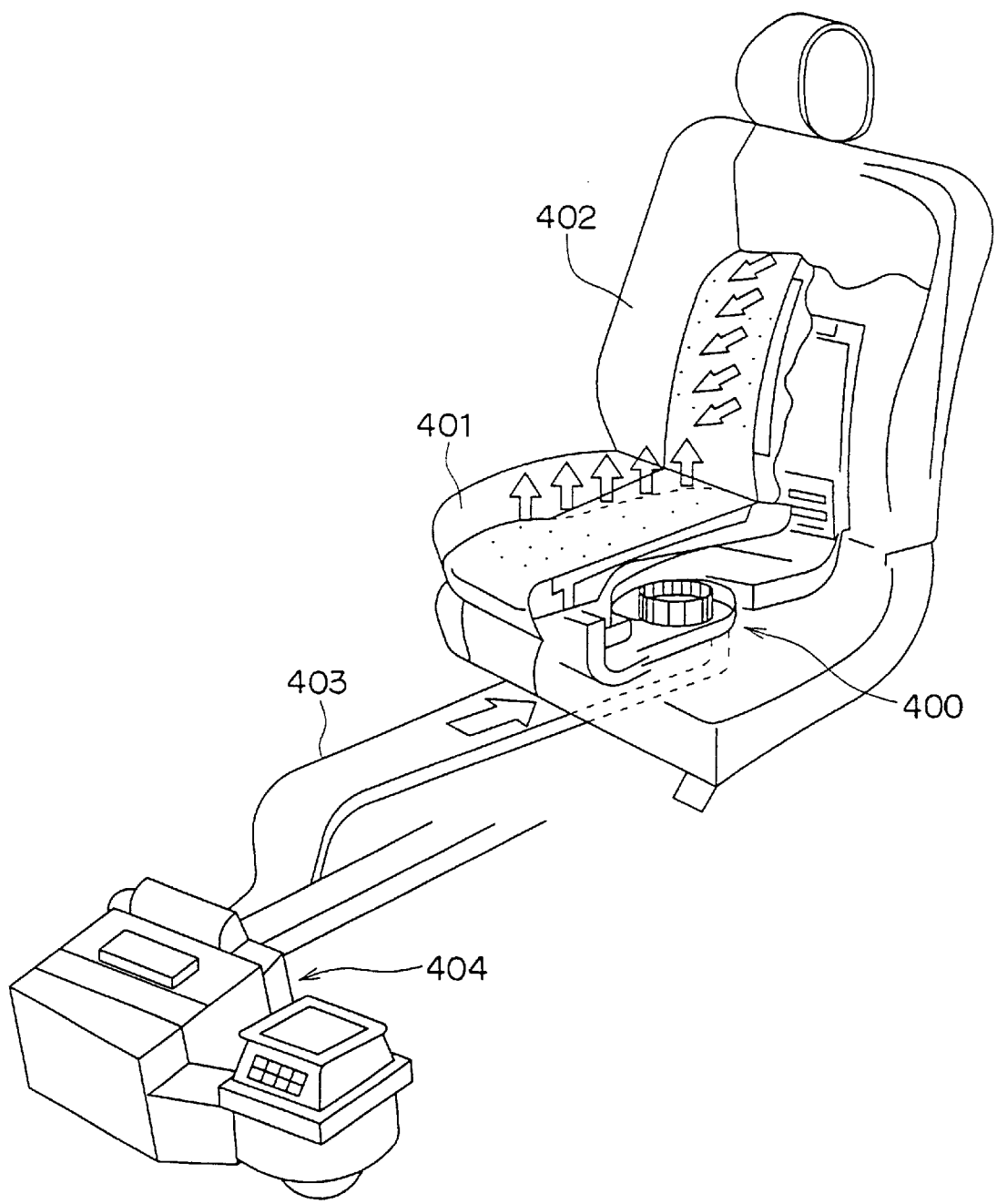
FIG. 14 is a schematic diagram showing a seat blower unit, according to a sixth embodiment of the present invention.

As shown in FIG. 14, a blower unit 400 for a vehicle seat is disposed so that conditioned air of an air conditioning unit 404 is blown from a seat cushion 401 and a seat back 402 directly to a passenger seated on the seat. Conditioned air adjusted in the air conditioning unit 404 is introduced into a suction port of the blower unit 400 through an air duct 403. The air conditioning unit 404 includes an evaporator for cooling air, a heater core for heating air, and a temperature adjustment member for adjusting air temperature.

The blower unit 400 includes a centrifugal fan 410 having plural blades 411, and an electrical motor 420 for rotating and driving the centrifugal fan 410.

Figure 15:
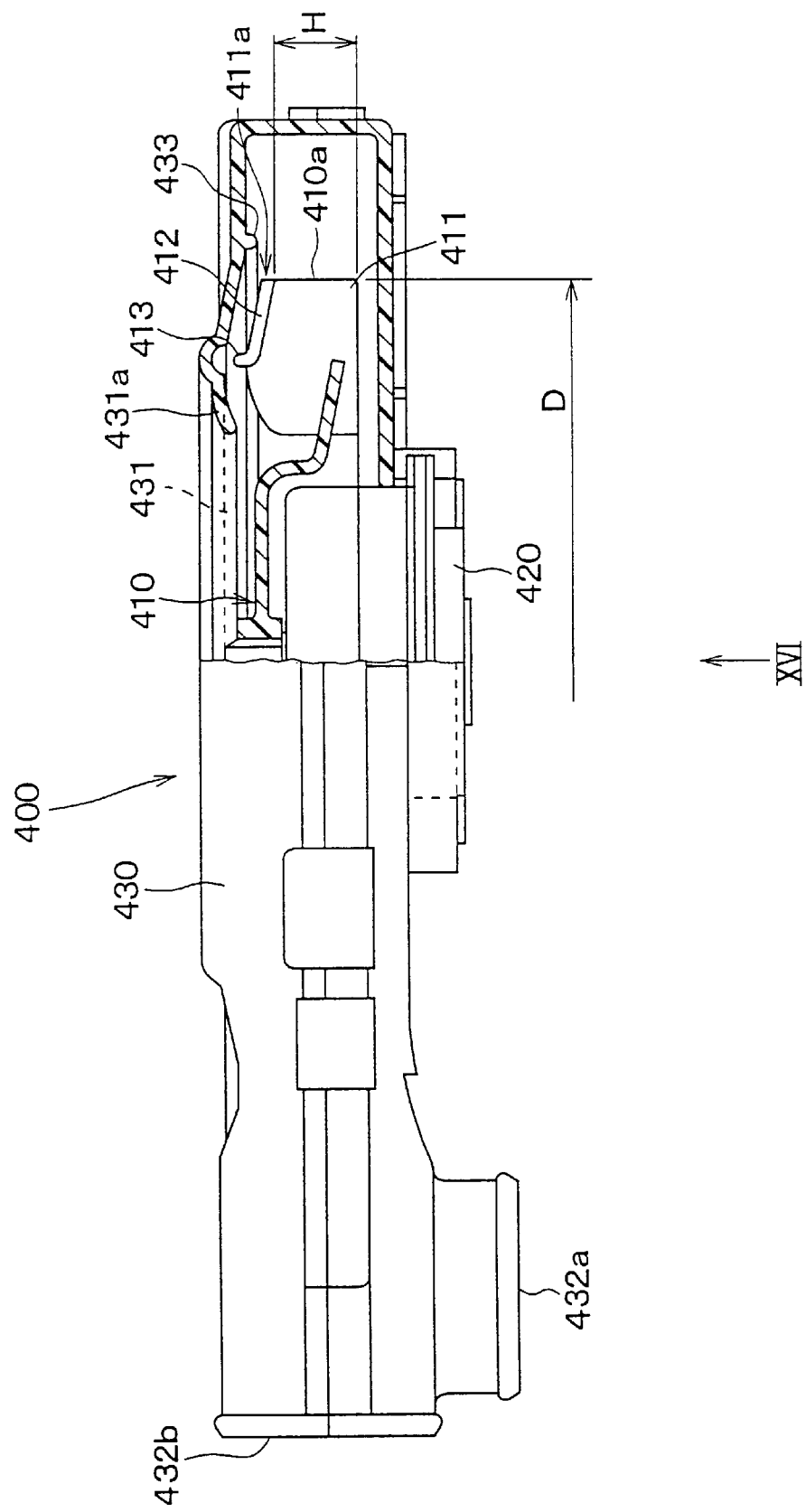
FIG. 15 is a partial sectional view showing the blower unit according to the sixth embodiment.
Figure 16:
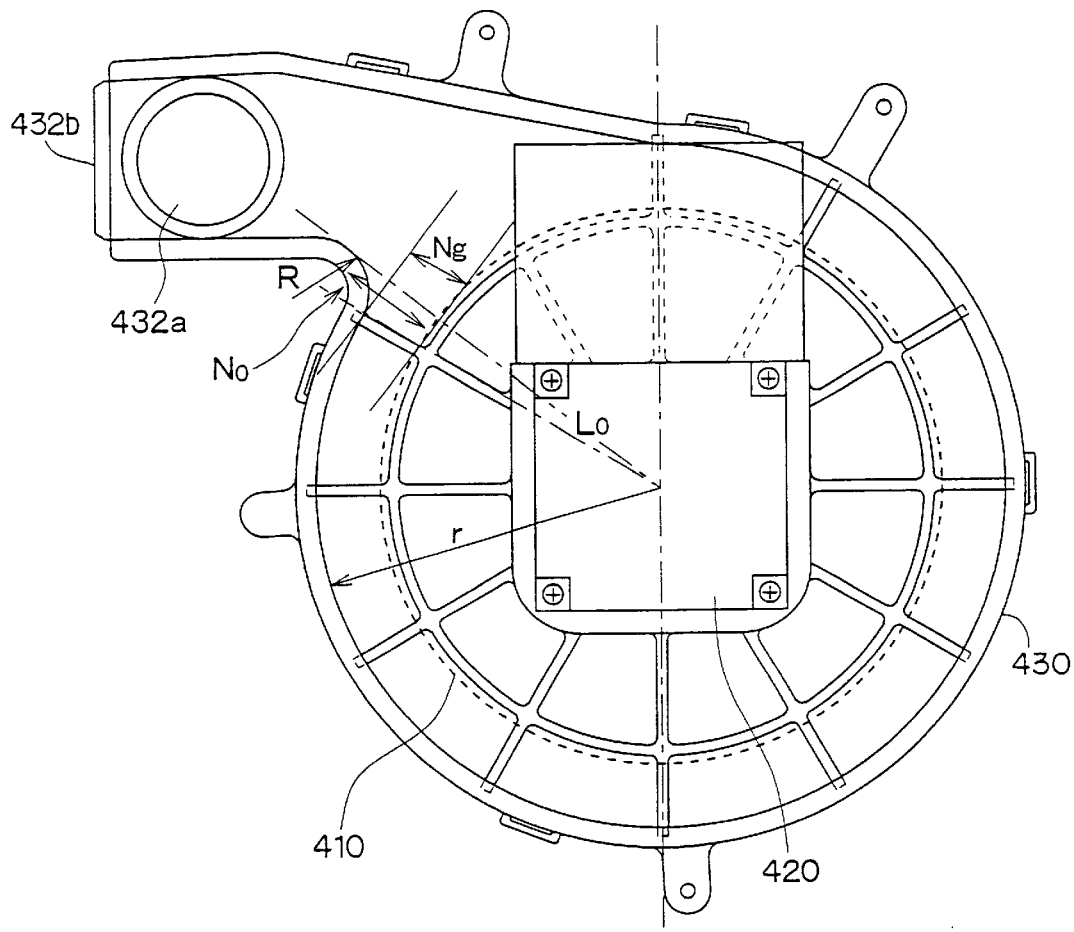
FIG. 16 is a side view when being viewed from arrow XVI in FIG. 15.

The blower unit 400 is disposed under the seat cushion 401 between the seat cushion 401 and a vehicle floor. In the sixth embodiment, the fan 410 is a flat-type fan in which a ratio (H/D) of a fan height H of the fan 410 to a fan diameter D of the fan 410 is set equal to or lower than 0.5. Here, the fan height H is a fan dimension in a direction parallel to a fan axial direction, as shown in FIG. 15.

The centrifugal fan 410 is disposed in a spiral-like scroll casing 430 having a scroll angle θ (spiral angle). A suction port 431 is provided in one side end surface of the scroll casing 430 in the axial direction, and air outlet ports 432a, 432b are provided in the scroll casing 430 at a scroll end side so that air is blown from the air outlet ports 432a, 432b toward the seat cushion 401 and the seat back 402.

In the sixth embodiment, the scroll angle θ of the scroll casing 430 is a rotation angle of the fan 410 from a reference line Lo connecting a radius center of a nose portion No and a rotation center of the fan 410 to a fan rotation direction. The radius "r" of the scroll casing 430 is changed in a logarithmic spiral line [r=ro·exp(θ·tan(n))]. Therefore, the scroll end of the scroll casing 430 is a point offset from the logarithmic spiral line of the radius "r" of the scroll casing 430, on the scroll end side. In the sixth embodiment, an expansion angle "n" is 1°, and "ro" is a radius of the casing 430 on the reference line Lo.

Figure 18:
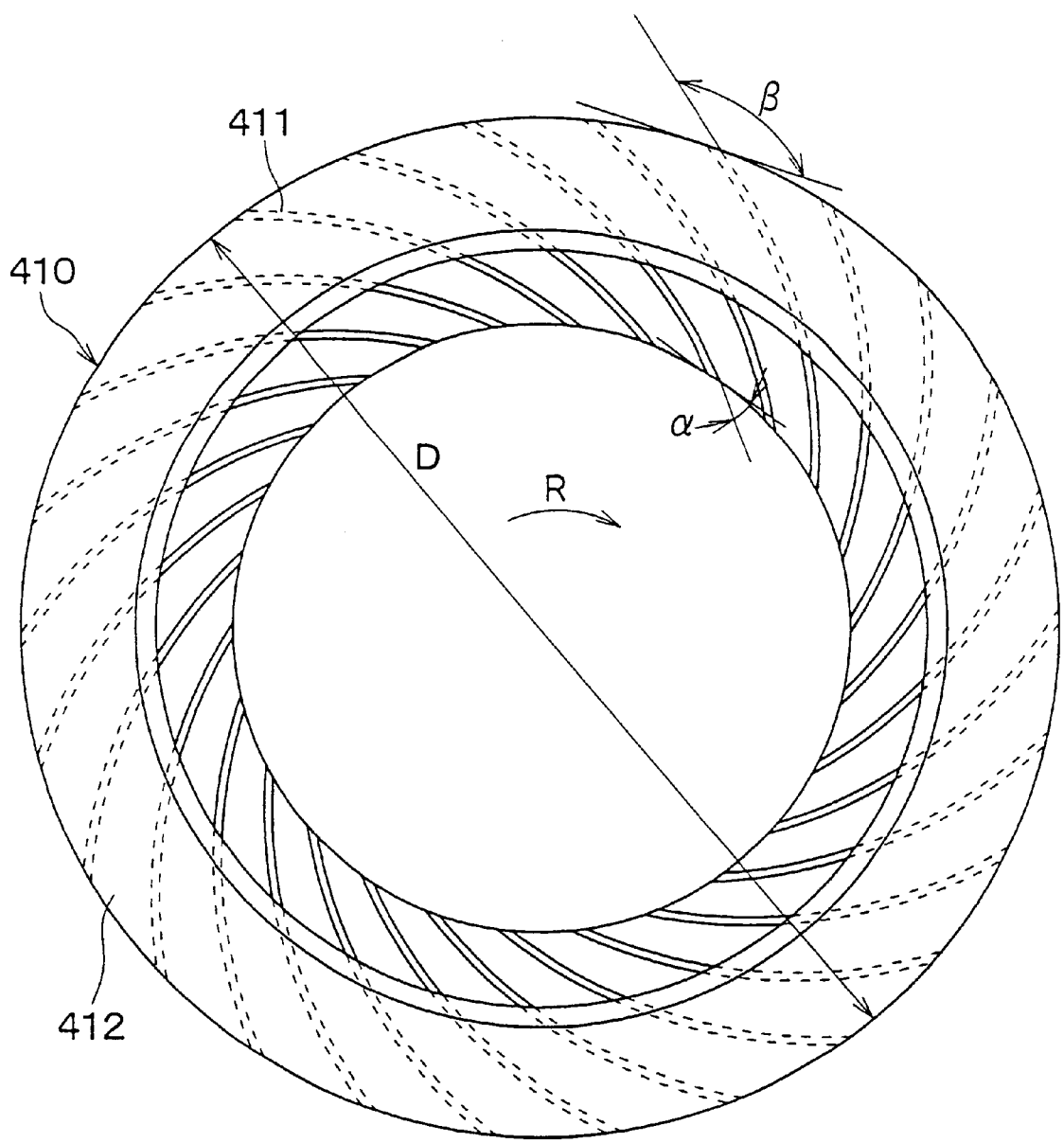
FIG. 18 is a schematic front view showing the fan of the blower unit, when being viewed from an air suction side of the fan, according to the sixth embodiment.

A bell-mouth portion 431a defining the suction port 431 is formed integrally with the scroll casing 430, to cover one end side of the blades 411 on the side of the suction port 431, and to extend an inner radial side of the fan 410. Shrouds 412 each of which is provided at the other end of the blades 411 of the fan 410 at the side of the suction port 431 are formed to have a bent shape bending along the air flow from a fan radial inner side to a fan radial outer side. In the sixth embodiment, an outlet angle β of the fan 410 is set in a range between 80–160°, so that an air pressure blown from the fan 410 is increased. For example, in the sixth embodiment, the fan 410 is a turbo fan having the fan inlet angle α of 50° and having the fan outlet angle β of 100°, as shown in FIG. 18. FIG. 18 is a front view when being viewed from the side of the suction port 431 of the fan 430. The fan outlet angle β is a cross angle between the blade 411 and an outer periphery of the fan 110 when being measured from a rotation moving side of the fan 410. On the other hand, the fan inlet angle α is a cross angle between the blade 411 and an inner periphery of the fan 110 when being measured from the rotation moving side of the fan 410.

A protrusion portion 413 protruding toward the bell mouth 431a is provided at an inner radial end of the shroud 412, and a recess is provided in the bell mouth 431a of the scroll casing 410 at a position corresponding to the protrusion portion 413, so that a check structure for preventing air from reversely flowing between the fan 410 and the casing 410 is formed.

Further, a circular protrusion portion 433 protruding toward the fan 410 along an entire outer peripheral side of the fan 410 is provided in the scroll casing 410 at the side of the suction port 431. The top end side of the circular protrusion portion 433 is positioned at a position corresponding to an end portion 411a in the air outlet portion 410a of the fan 410 at the side of the suction port 431. Specifically, a protrusion height "h" of the protrusion portion 433 is set at 0.5% of (3 mm±H). Here, H is the fan height.

Further, a dimension of nose gap (nose G) from the fan 410 to the nose portion No of the scroll casing 410 in the radial direction is set in a range between 0.08 D and 0.2 D, and the curvature radius R (nose R) of the nose portion No is set in a range between 0.08 D and 0.25 D. Here, D is the fan diameter. For example, in the sixth embodiment, the dimension of the nose gap between the fan 410 and the nose portion No of the casing 410 is set at 0.08 D, and the curvature radius R is set at 0.13 D.

More preferably, the nose portion No is set in such a manner that the dimension of the nose gap from the fan 410 to the nose portion No of the casing 410 is set in a range between 0.1 D and 0.2 D, and the curvature radius R of the nose portion No is set in a range between 0.1 D and 0.13 D.

Figure 19A:
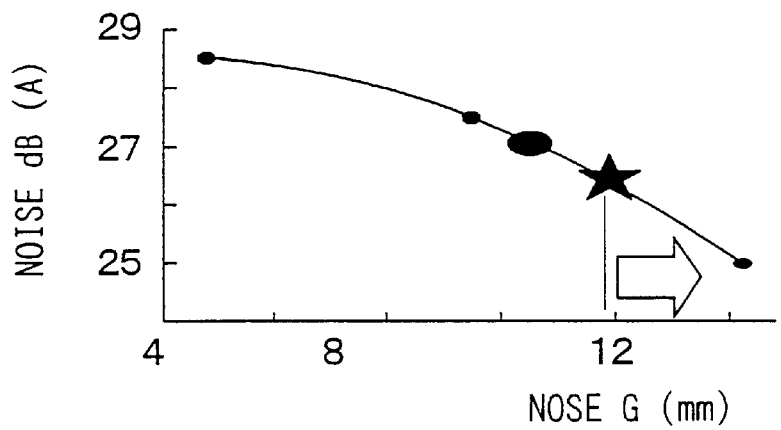
FIG. 19A is a graph showing a relationship between a nose gap (nose G) and a specific noise level.
Figure 19B:
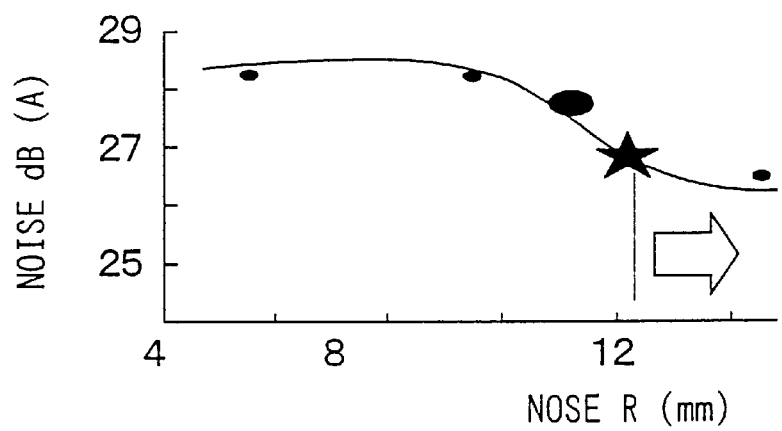
FIG. 19B is a graph showing a relationship between a nose bending radius (nose R) and the specific noise level.
Figure 19C:
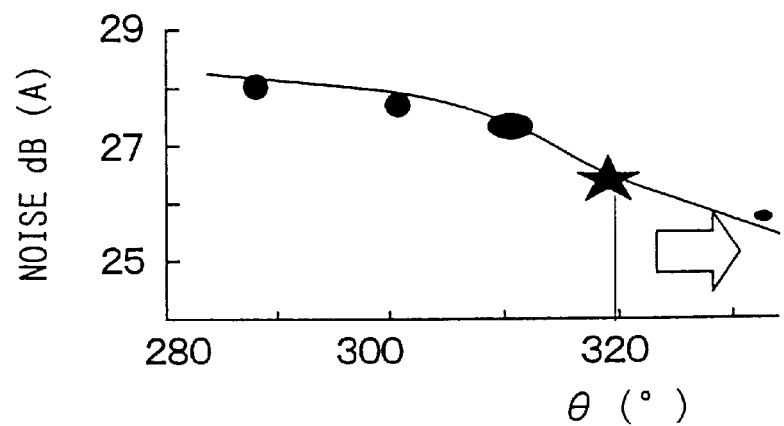
FIG. 19C is a graph showing a relationship between a scroll angle (θ) and the specific noise level, according to the sixth embodiment.
Figure 20:
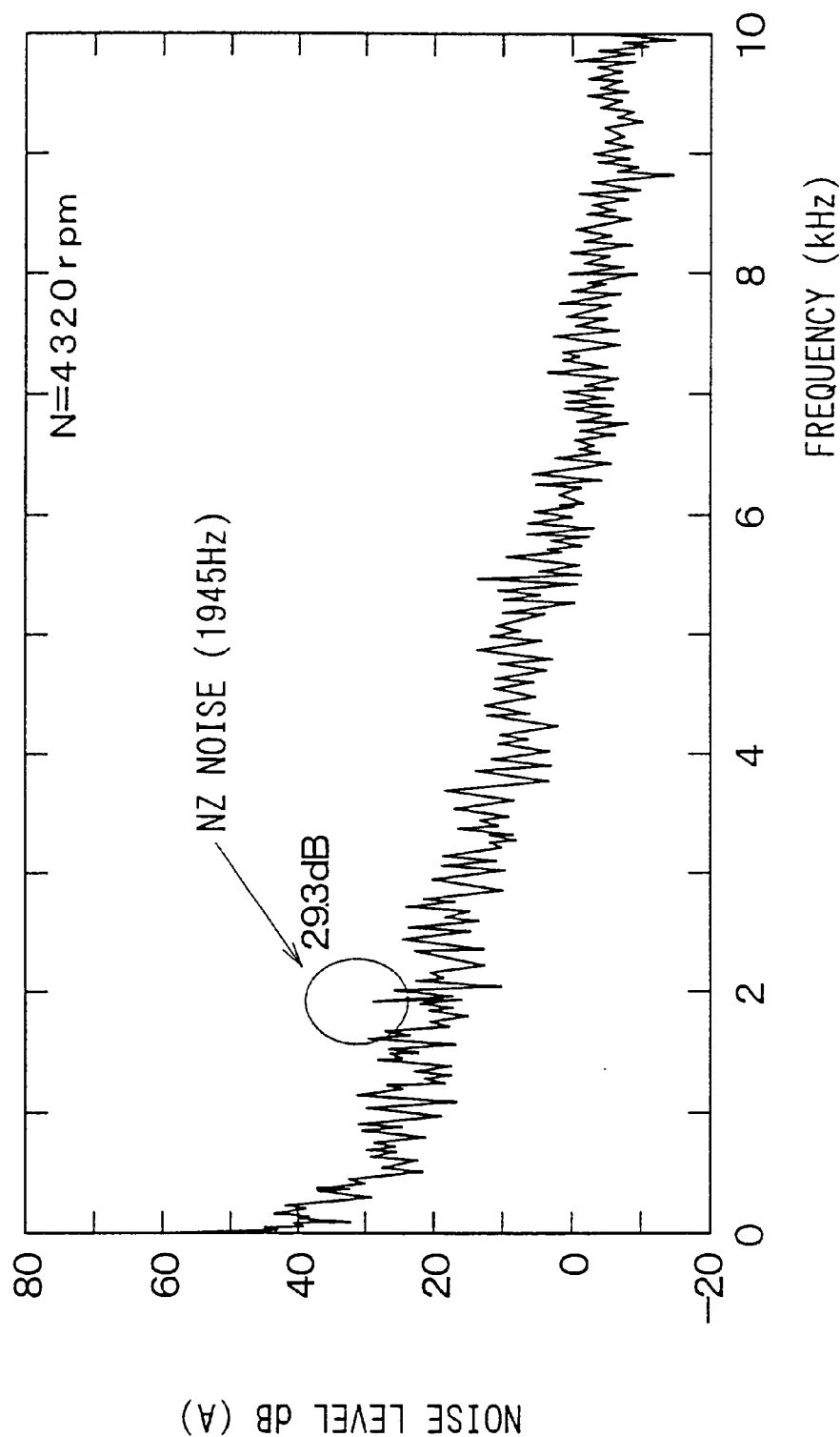
FIG. 20 is a graph showing a relationship between a noise level and a frequency, according to the sixth embodiment.
Figure 21:
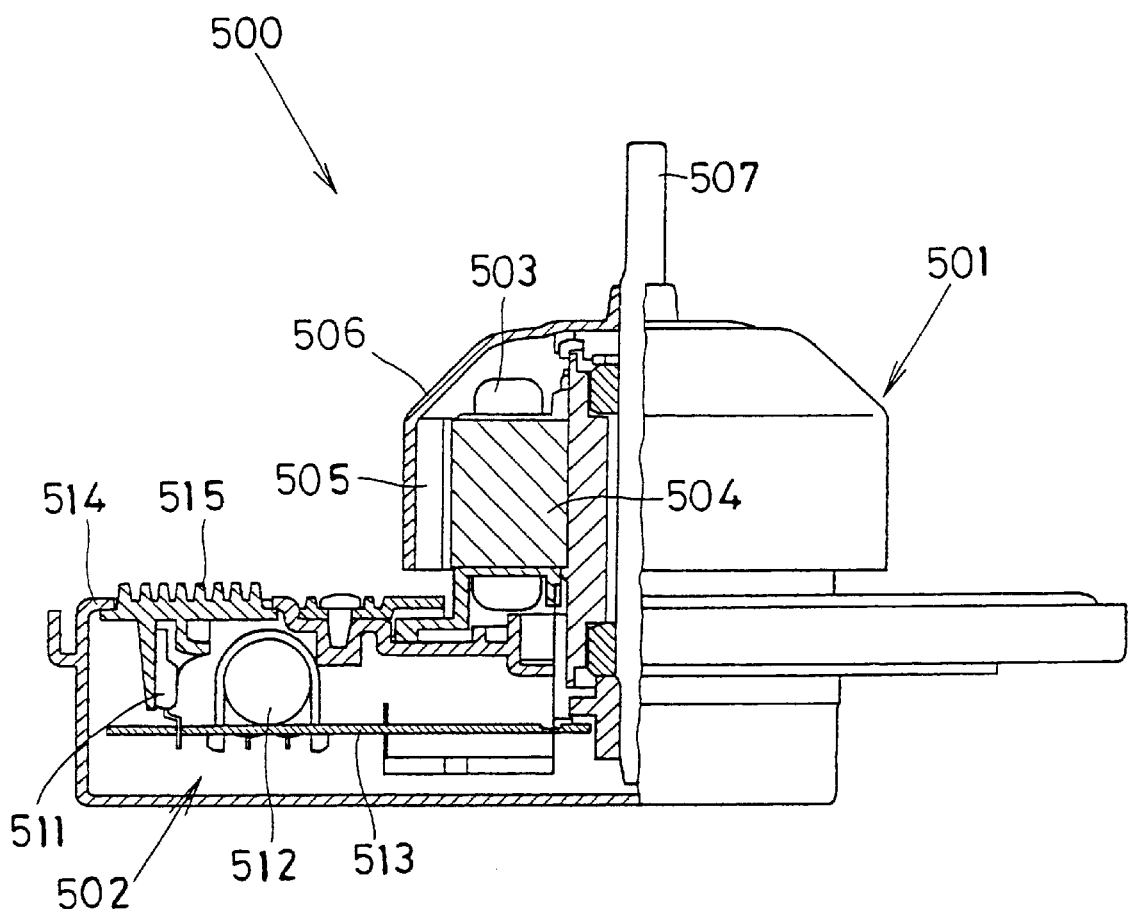
FIG. 21 is a partial sectional view showing a blower unit for seat air-conditioning in a related art.

FIG. 19A is an experimental result showing a relationship between the dimension of the nose gap (nose G) and a specific noise level, FIG. 19B is an experimental result showing a relationship between the curvature radius R (nose R) and the specific noise level, and FIG. 19C is an experimental result showing a relationship between the scroll angle θ and the specific noise level. Further, FIG. 20 is an experimental result showing a relationship between a noise level and a frequency. As the dimension of the nose gap increases, a collision force of air blown from the fan 410, colliding with the nose portion No, reduces. Accordingly, as shown in FIG. 19A, as the dimension of the nose gap increases, the specific noise level is reduced.

As the nose curvature radius R increases, air can smoothly flow around the nose portion No. Therefore, as shown in FIG. 19B, as the nose curvature radius R increases, the specific noise level is reduced. Further, as the scroll angle θ increases, the air flow can be regulated by the casing 430. Therefore, as the scroll angle θ becomes larger, the specific noise level can be reduced. Accordingly, in the sixth embodiment, the dimension of the nose gap is set in a range between 0.08 D and 0.2 D, the nose curvature radius R is set in a range between 0.08 D and 0.25 D, and the scroll angle θ is set equal to or more than 300°.

In the sixth embodiment, because the circular protrusion portion 433 is provided in the scroll casing 430, it can prevent the pressure of air blown from the fan 410 from being reduced.

Figure 17:
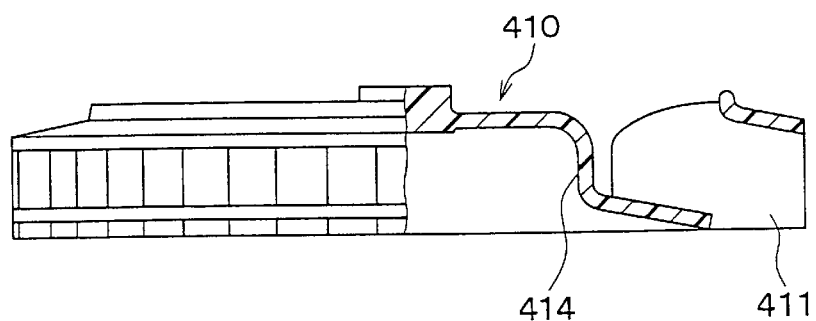
FIG. 17 is a partial sectional view showing a fan of the blower unit, according to the sixth embodiment.

As shown in FIGS. 17 and 18, because the shroud 412 and the boss portion 414 supporting the blades 411 are offset when being viewed in a rotation axial direction, the shroud 412 and the boss portion 414 can be readily removed from a die when the fan 110 is molded by a resin.

Although the present invention has been fully described in connection with preferred embodiments thereof with reference to the accompanying drawings, it is to be noted that various changes and modifications will become apparent to those skilled in the art.

For example, in the above-described first embodiment, the three-phase full-wave drive IC circuit 55 of the motor drive circuit 7 is provided on the outside surface of the drive circuit covering part 62 formed integrally with the motor attachment bracket 10. However, the three-phase full-wave drive IC circuit 55 of the motor drive circuit 7 may be disposed in the drive circuit covering part 62 formed integrally with the motor attachment bracket 10 to contact the inside surface of the motor attachment bracket 10.

In the above-described embodiments, the plural switching devices or at least one switching device are constituted by the MOS-FETs 75. However, the plural switching devices or at least one switching device may be constituted by plural power field effect transistors (static induction transistors), plural power bipolar transistors (triple diffusion type transistors, Darlington transistors), IGBTs, or thyristors. Further, in the above-described embodiments, the hole devices 94–96 are used as the position detecting means. However, a Hall IC or a magneto resistance device may be used as the position detecting means.

In the above-described embodiment, the brushless flat motor 6 made of the DC brushless motor constructed by the stator having the three-phase armature windings 41–43 and the outer rotor 45 having the plural permanent magnets 44 is used as the fan motor for rotating the fan. However, an AC synchronous motor (AC motor) for rotating a rotor mounted with permanent magnets by the use of a three-phase alternating current may be used as the fan motor for rotating the fan. In this case, the three-phase alternating current is passed through the three-phase armature windings of the stator to generate a rotating magnetic field in the AC motor. Further, a DC motor constituted by a field pole (stator) having a field coil and an armature (rotor) having an armature winding may be used as the fan motor for rotating the fan. In this case, it is possible to vary the rotational speed of the DC motor by increasing or decreasing a current passing through the field coil or the armature winding.

In the above-described embodiments, the unit case 4 (seat air conditioning unit) of the flat-type blower unit 2 is for introducing conditioned air (cool air or warm air) in the air conditioning duct of the front air conditioning unit to the surface of the front seat 1. However, the blower unit may be used for a seat air conditioning unit for introducing conditioned air (cool air or warm air) in an air conditioning duct of a rear air conditioning unit to the surface of the front seat 1.

In the above-described embodiments of the present invention, the present invention is applied to the blower unit disposed under the seat in the passenger compartment for blowing air toward the seat surface from the seat. However, the present invention can be applied to a blower unit disposed in a narrow space, such as in an air cleaner and a ceiling air conditioner.

In the above-described sixth embodiment, the fan inlet angle α and the fan outlet angle β can be changed to the other angles.

Such changes and modifications are to be understood as being within the scope of the present invention as defined by the appended claims.

What is claimed is:

1. A blower unit, adapted to be mounted in a flat space between a seat and a floor of a vehicle for blowing air from a seat surface of the seat, the blower unit comprising:
    a unit case for defining therein a scroll air passage, the unit case having a suction port on a first end surface facing the floor from which air is sucked to be blown toward the seat surface through the scroll air passage;
    a centrifugal fan rotating in the unit case around an axis to blow air sucked from the suction port radially outside in the air passage;
    a motor for rotating and driving the fan;
    a motor drive circuit for controlling a rotation speed of the motor, the motor drive circuit having a heat-generating member which generates heat when being operated; and
    a motor attachment bracket for attaching the motor to the unit case, the motor attachment bracket extending in a radial direction of the motor along a second end surface of the unit case outside the unit case, the second end surface being opposite to the first end surface, wherein:
    the second end surface of the unit case has a through hole through which the motor and the motor driving circuit are attached into the unit case;
    the heat-generating member of the motor drive circuit is disposed to contact the motor attachment bracket;
    the fan is a centrifugal fan having a plurality blades around an axial direction of the centrifugal fan, the centrifugal fan being disposed such that air sucked in the axial direction is blown toward a radial outside;
    the unit case includes a scroll casing for accommodating the centrifugal fan, the scroll casing having a nose portion from which a scroll shape of the scroll casing starts;
    the centrifugal fan has a fan height (H) in the axial direction, and a ratio (H/D) of the fan height to a fan diameter (D) of the centrifugal fan is equal to or lower than 0.5;
    the centrifugal fan is disposed in the scroll casing to have a dimension between the centrifugal fan and the nose portion of the scroll casing in a radial direction, the dimension being equal to or larger than 0.08 times of the fan diameter (D);
    the scroll casing has a suction port from which air is sucked in the axial direction, and a protrusion provided along an entire radial outer peripheral side of the centrifugal fan to protrude toward the centrifugal fan; and
    the protrusion has a protrusion end at a position corresponding to an end portion of the blades of the centrifugal fan.

2. The blower unit according to claim 1, wherein the motor attachment bracket is disposed to cover the motor drive circuit.

3. The blower unit according to claim 1, wherein the motor attachment bracket is made of a metal material having a thermal conductivity higher than a predetermined conductivity.

4. The blower unit according to claim 1, wherein the motor drive circuit includes an anti-EMI LC filter for preventing radio wave interference and an electrical noise.

5. The blower unit according to claim 1, wherein the motor attachment bracket is disposed outside the unit case along an outer wall surface of the unit case, to protrude radial outside from the motor.

6. The blower unit according to claim 1, wherein:
    the unit case is disposed between a seat cushion of a seat and a floor of the vehicle, in such a manner that air in the air passage is introduced into a seat surface of the seat cushion of the seat; and
    the unit case, the motor drive circuit and the motor attachment bracket are disposed to have a dimension smaller than a predetermined value in a vertical direction.

7. The blower unit according to claim 6, wherein the motor attachment bracket is disposed under the seat cushion, and the motor drive circuit is disposed under the motor attachment bracket.

8. The blower unit according to claim 1, wherein:
    the motor drive circuit includes circuit components including the heat-generating member for controlling the operation of the motor, and a circuit board on which the circuit components are mounted;
    the circuit board is extending in a surface;
    the circuit components are disposed to protrude from the circuit board in a perpendicular direction perpendicular to the surface to have a maximum protrusion height;
    the motor attachment bracket protrudes from the circuit board in the perpendicular direction by a protrusion height that is lower than the maximum protrusion height; and
    the motor attachment bracket has a surface area that is approximately equal to that of the circuit board of the motor drive circuit.

9. The blower unit according to claim 1, wherein:
    the fan includes a bottom plate to which a rotation force of a rotation shaft of the motor is transmitted, and a plurality of blades disposed at an outer peripheral portion of the bottom plate at equal intervals;
    the bottom plate has a boss portion at a center portion, into which the rotation shaft of the motor is fastened to fix the bottom plate to the rotary shaft; and
    the center portion of the bottom plate having the boss portion is depressed inside with respect to an outer peripheral portion so as to reduce a protrusion amount of the motor protruding from the unit case to an outside.

10. The blower unit according to claim 1, wherein:

the motor includes a stator having polyphase armature windings, and a rotor having a permanent magnet;

the rotor is disposed to be rotatable relative to the stator; and the heat-generating member includes a plurality of switching devices for passing electrical current through the polyphase armature windings in sequence so that a rotating magnetic field is generated in the motor.

11. The blower unit according to claim 10, wherein:

the motor drive circuit includes an inverter circuit having the switch devices, a position detection unit for detecting a relative rotation position of the rotor relative to the stator, and a motor control circuit for controlling operation of the switch devices based on a detection value of the position detection unit.

12. The blower unit according to claim 11, wherein:

the motor drive circuit is electrically connected to one of a computer for sending a digital signal for controlling the rotation speed of the motor to the motor drive circuit, and a variable resistor for sending an analog signal for controlling the rotation speed of the motor to the motor drive circuit.

13. The blower unit according to claim 1, wherein the centrifugal fan has an outlet angle that is in a range between 80° and 160°.

14. The blower unit according to claim 1, wherein:

the centrifugal fan defines a center space located radially inward from the blades; and the motor is disposed within the center space to be partially overlapped with the centrifugal fan in the axial direction.

15. The blower unit according to claim 1, wherein:

the centrifugal fan includes a bottom plate that has a fan boss portion protruding toward the floor of the vehicle at a center space of the bottom plate;

the bottom plate is disposed to define the center space;

the motor has a rotary shaft and is disposed in the center space such that the rotary shaft is inserted into the fan boss portion to be fixed to the fan boss portion;

the bottom plate is disposed to cover a part of an outer periphery of the motor; and the blades are connected to an outer periphery portion of the bottom plate.

16. The blower unit according to claim 1, further comprising:

a motor attachment portion and a cover attachment portion provided in the unit case around the through hole, wherein:

the motor attachment bracket includes a drive circuit cover portion for covering the motor drive circuit;

the motor attachment portion is disposed for attaching the motor and the motor driving circuit to the unit case; and the drive circuit cover portion is disposed on the cover attachment portion to cover the motor drive circuit.

17. The blower unit according to claim 1, wherein the motor attachment bracket extends approximately horizontally.

* * * * *